(12) United States Patent
Yudelevich et al.

(10) Patent No.: US 12,715,356 B2
(45) **Date of Patent: *Aug. 25, 2026**

(54) SCHOOL BUS STOP ARM AND DRIVE UNIT THEREFOR

(71) Applicant: SMARTREND MANUFACTURING GROUP (SMG), INC., Winnipeg (CA)

(72) Inventors: Michael Yudelevich, Winnipeg (CA); Kevin Peter Smith, Winnipeg (CA); Bradley Dale Brown, Winnipeg (CA); Andrew Allan Clark Mckay, Winnipeg (CA); Cam Forman, Winnipeg (CA); David Beernaert, Winnipeg (CA)

(73) Assignee: SMARTREND MANUFACTURING GROUP (SMG), INC., Winnipeg (CA)

( * ) Notice: Subject to any disclaimer, the term of this patent is extended or adjusted under 35 U.S.C. 154(b) by 0 days.

This patent is subject to a terminal disclaimer.

(21) Appl. No.: 19/222,525

(22) Filed: May 29, 2025

(65) Prior Publication Data

US 2025/0289361 A1 Sep. 18, 2025

Related U.S. Application Data

(63) Continuation of application No. 18/970,467, filed on Dec. 5, 2024, which is a continuation of application No. 18/481,888, filed on Oct. 5, 2023, now Pat. No. 12,358,425, which is a continuation of application No. 18/057,654, filed on Nov. 21, 2022, now Pat. No.
(Continued)

(51) Int. Cl.
*B60Q 1/50* (2006.01)
*B60Q 1/26* (2006.01)

(52) U.S. Cl.
CPC .......... *B60Q 1/2692* (2013.01); *B60Q 1/503* (2013.01); *B60Q 2400/50* (2013.01)

(58) Field of Classification Search
CPC .......... B60Q 1/50; B60Q 1/2692; B60Q 1/26; B60Q 1/503; B60Q 2400/50
See application file for complete search history.

(56) References Cited

U.S. PATENT DOCUMENTS 4,096,551 A 6/1978 Prester
4,138,668 A 2/1979 Latta, Jr. et al.
(Continued)

FOREIGN PATENT DOCUMENTS

CA 2282100 A1 3/2001
CN 2282100 Y 5/1998
(Continued)

OTHER PUBLICATIONS

Sound Off CVP Driver Alert Message Sign [ online], retrieved from the Internet Feb. 24, 2021, <https://youtu.be/k0Plh2AMxnQ> (dated Mar. 22, 2017), 1 page.
(Continued)

*Primary Examiner* — Hoi C Lau
(74) *Attorney, Agent, or Firm* — Brooks Kushman P.C.

(57) ABSTRACT

A school bus stop arm and drive unit therefor are disclosed. The stop arm includes a stop sign and a drive unit for moving the stop sign between a retracted position and a deployed position. In some embodiments the stop sign is illuminated. In some embodiments the drive unit includes a controller.

27 Claims, 13 Drawing Sheets

Related U.S. Application Data 11,820,283, which is a continuation of application No. 17/259,876, filed as application No. PCT/CA2019/050968 on Jul. 12, 2019, now Pat. No. 11,554,715.

(60) Provisional application No. 62/758,095, filed on Nov. 9, 2018, provisional application No. 62/697,974, filed on Jul. 13, 2018.

(56) References Cited

U.S. PATENT DOCUMENTS

| | | | | |
|---|---|---|---|---|
| 4,339,744 | A | 7/1982 | Latta, Jr. | |
| 4,559,518 | A | 12/1985 | Latta, Jr. | |
| 4,766,413 | A | 8/1988 | Reavell | |
| 4,816,804 | A | 3/1989 | Reavell | |
| 4,916,372 | A | 4/1990 | Reavell et al. | |
| 4,956,630 | A * | 9/1990 | Wicker | B60Q 1/52 116/28 R |
| 4,983,949 | A | 1/1991 | Wicker | |
| 5,036,307 | A | 7/1991 | Reavell et al. | |
| 5,038,136 | A | 8/1991 | Watson | |
| 5,132,662 | A | 7/1992 | Burch | |
| 5,166,663 | A | 11/1992 | Leis | |
| 5,184,116 | A | 2/1993 | Daugherty et al. | |
| 5,276,424 | A | 1/1994 | Hegemann | |
| 5,281,948 | A | 1/1994 | Estrada | |
| 5,293,151 | A | 3/1994 | Rose | |
| 5,406,250 | A | 4/1995 | Reavell et al. | |
| 5,406,251 | A | 4/1995 | Leis | |
| 5,566,484 | A | 10/1996 | Wachter | |
| 5,570,127 | A | 10/1996 | Schmidt | |
| 5,634,287 | A * | 6/1997 | Lamparter | B60Q 1/503 362/540 |
| 5,635,902 | A | 6/1997 | Hochstein | |
| 5,687,500 | A * | 11/1997 | Lamparter | G09F 13/0413 362/240 |
| 5,719,553 | A | 2/1998 | Lamparter | |
| 5,793,420 | A | 8/1998 | Schmidt | |
| 5,796,331 | A * | 8/1998 | Lamparter | G09F 13/0472 116/28 R |
| 5,812,052 | A | 9/1998 | Swanger et al. | |
| 6,009,650 | A | 1/2000 | Lamparter | |
| 6,099,933 | A * | 8/2000 | Lamparter | G09F 13/04 428/122 |
| 6,253,477 | B1 | 7/2001 | Balint | |
| 6,337,623 | B1 | 1/2002 | Krugh, IV et al. | |
| 6,396,395 | B1 | 5/2002 | Zielinski et al. | |
| 6,420,832 | B2 * | 7/2002 | Rabine | H05B 39/02 315/200 A |
| 6,765,481 | B2 * | 7/2004 | Haigh | G09F 21/04 340/545.4 |
| 6,778,072 | B2 * | 8/2004 | Phillips | B60Q 1/503 180/281 |
| 6,864,784 | B1 | 3/2005 | Loeb | |
| 6,894,604 | B2 * | 5/2005 | Phillips | B60Q 1/50 180/281 |
| D516,125 | S | 2/2006 | Fincher | |
| 7,005,973 | B2 * | 2/2006 | Haigh | G09F 21/04 340/545.4 |
| 7,233,259 | B2 * | 6/2007 | Gibson | G08G 1/095 40/586 |
| 7,559,575 | B1 | 7/2009 | Cook et al. | |
| 8,075,169 | B2 | 12/2011 | Englander | |
| 8,164,483 | B1 | 4/2012 | Phillips | |
| 8,599,260 | B1 | 12/2013 | Vaughn | |
| 8,669,853 | B1 | 3/2014 | Gardner | |
| D712,968 | S | 9/2014 | Gorelick et al. | |
| 9,245,465 | B1 * | 1/2016 | Geyer | B60R 21/34 |
| D776,202 | S | 1/2017 | Zenoff | |
| 10,062,309 | B1 | 8/2018 | Ringer | |
| 10,206,834 | B2 | 2/2019 | Furman et al. | |
| 10,687,999 | B2 | 6/2020 | Furman et al. | |
| 10,890,915 | B2 * | 1/2021 | Pedersen | G05D 1/0044 |
| 10,962,860 | B2 | 3/2021 | Okuyan et al. | |
| 11,013,651 | B2 | 5/2021 | Furman et al. | |
| 11,170,673 | B2 * | 11/2021 | Gamble | G09F 13/0413 |
| 11,348,491 | B2 * | 5/2022 | Gamble | G09F 13/18 |
| 11,377,123 | B2 * | 7/2022 | Mortazavi | G08G 1/042 |
| 11,554,715 | B2 * | 1/2023 | Yudelevich | B60Q 1/503 |
| 11,638,668 | B2 | 5/2023 | Furman et al. | |
| 11,724,645 | B1 * | 8/2023 | Abernathy | H04N 7/188 340/435 |
| 11,820,283 | B2 * | 11/2023 | Yudelevich | B60Q 1/2692 |
| 12,048,659 | B2 | 7/2024 | Furman et al. | |
| 12,358,425 | B2 * | 7/2025 | Yudelevich | B60Q 1/503 |
| 12,494,142 | B2 * | 12/2025 | Gamble | G09F 13/14 |
| 2003/0061982 | A1 | 4/2003 | Phillips et al. | |
| 2003/0089011 | A1 | 5/2003 | Haigh et al. | |
| 2004/0183694 | A1 * | 9/2004 | Bauer | G08G 1/095 340/933 |
| 2004/0201498 | A1 * | 10/2004 | Haigh | G09F 21/04 340/908 |
| 2004/0232859 | A1 * | 11/2004 | Phillips | B60Q 1/50 318/1 |
| 2006/0061487 | A1 | 3/2006 | Heap | |
| 2007/0205917 | A1 | 9/2007 | Nickson et al. | |
| 2007/0252538 | A1 | 11/2007 | Swanger | |
| 2007/0290886 | A1 * | 12/2007 | Stam | G08G 1/052 340/907 |
| 2008/0007191 | A1 | 1/2008 | Chinsen et al. | |
| 2008/0169918 | A1 * | 7/2008 | Vidri | B60Q 1/50 340/487 |
| 2011/0219648 | A1 | 9/2011 | James et al. | |
| 2012/0013454 | A1 | 1/2012 | Krugh, IV | |
| 2014/0098231 | A1 | 4/2014 | Buley et al. | |
| 2015/0075073 | A1 | 3/2015 | Sylvester | |
| 2015/0353031 | A1 | 12/2015 | Cairo | |
| 2016/0096469 | A1 | 4/2016 | O'Brien | |
| 2016/0166453 | A1 | 6/2016 | Furman et al. | |
| 2018/0345852 | A1 | 12/2018 | Ringer | |
| 2019/0043352 | A1 | 2/2019 | Baek | |
| 2019/0240094 | A1 | 8/2019 | Furman et al. | |
| 2019/0272779 | A1 * | 9/2019 | Gamble | G09F 13/08 |
| 2019/0329704 | A1 | 10/2019 | Ringer | |
| 2019/0339701 | A1 * | 11/2019 | Pedersen | G05D 1/0044 |
| 2020/0049947 | A1 | 2/2020 | Okuyan et al. | |
| 2020/0269877 | A1 * | 8/2020 | Mortazavi | G08G 1/0129 |
| 2020/0276067 | A1 | 9/2020 | Furman et al. | |
| 2021/0072756 | A1 * | 3/2021 | Pedersen | G01C 21/3407 |
| 2021/0086688 | A1 | 3/2021 | Gucwa | |
| 2021/0221283 | A1 * | 7/2021 | Yudelevich | B60Q 1/503 |
| 2021/0236358 | A1 | 8/2021 | Furman et al. | |
| 2021/0366321 | A1 * | 11/2021 | Gamble | G09F 13/18 |
| 2022/0319361 | A1 * | 10/2022 | Gamble | B60Q 1/263 |
| 2023/0089438 | A1 * | 3/2023 | Hatoum | B60Q 1/2657 248/550 |
| 2023/0158948 | A1 * | 5/2023 | Yudelevich | B60Q 1/2692 340/330 |
| 2023/0263676 | A1 | 8/2023 | Furman et al. | |
| 2024/0025335 | A1 * | 1/2024 | Yudelevich | B60Q 1/2692 |
| 2025/0091505 | A1 * | 3/2025 | Yudelevich | B60Q 1/503 |
| 2025/0289361 | A1 * | 9/2025 | Yudelevich | B60Q 1/2692 |

FOREIGN PATENT DOCUMENTS

| | | | |
|---|---|---|---|
| CN | 201145958 | Y | 11/2008 |
| CN | 101632112 | A | 1/2010 |
| CN | 201868053 | U | 6/2011 |
| CN | 202383936 | U | 8/2012 |
| CN | 202624059 | U | 12/2012 |
| CN | 202838873 | U | 3/2013 |
| CN | 202896400 | U | 4/2013 |
| CN | 103273879 | A | 9/2013 |
| CN | 103303193 | A | 9/2013 |
| CN | 203198835 | U | 9/2013 |
| CN | 103568937 | A | 2/2014 |
| CN | 203485825 | U | 3/2014 |
| CN | 103863186 | A | 6/2014 |
| CN | 204915456 | U | 12/2015 |

(56) References Cited

FOREIGN PATENT DOCUMENTS

| | | | |
|---|---|---|---|
| CN | 205787880 | U | 12/2016 |
| CN | 207140940 | U | 3/2018 |
| JP | H10105094 | A | 4/1998 |

OTHER PUBLICATIONS

CPD Lighting, CPD Lite Tile-6MM Led Light Panel, [retrieved from Internet Sep. 29, 2023] <https://web.archive.org/web/20180219002045/http://cpdlighting.com/upload/20171 I/30/201711302354556289.pdf> (Feb. 19, 2018) (2 pages).

CPD Lighting, Signage, Design, and Project Management [retrieved from Internet Sep. 29, 2023] <https://web .archive .org/web/20140207233023/http://cpdlighting.com/> (Feb. 7, 2014) (2 pages).

* cited by examiner 10
14
20
54a
18
22
24a
100a
102a
88
60
56
STOP
20a
30
100d
102c
32
12
16
86
56
60
26
24b
104
34
62
54b 10
20
18

54a
70
24a
22
102a
16
12
100a
60
58
94
98
94
92
90
70
STOP
100c
96
94
30
58
94
32
34
28
24b
60
70
54b
64

36
52a
34
STOP
32
30
26
52b 36
44
52a
38
52a
48
34
STOP
46
32
30
50
42
52b
40

18
20
22
78
69
68
66
64
62
74
76

62
36
84
72
82
44

36'
70
84
82
82a
64
44'
76
82
48
78
80
74
72
66

88
102a
100c
STOP
104
86
102d 100a
102a
98
86
STOP
100d
96
94
102c
88
94
92
90

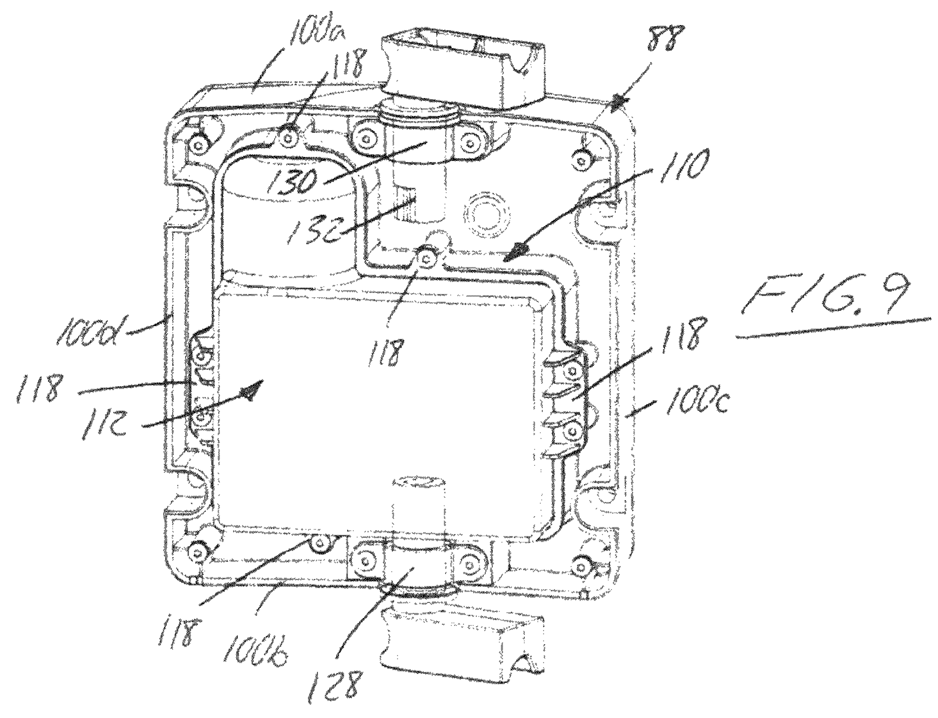
100a
118
88
130
110
132
F1G.9
100d
118
118
118
112
100c
118
100b
128
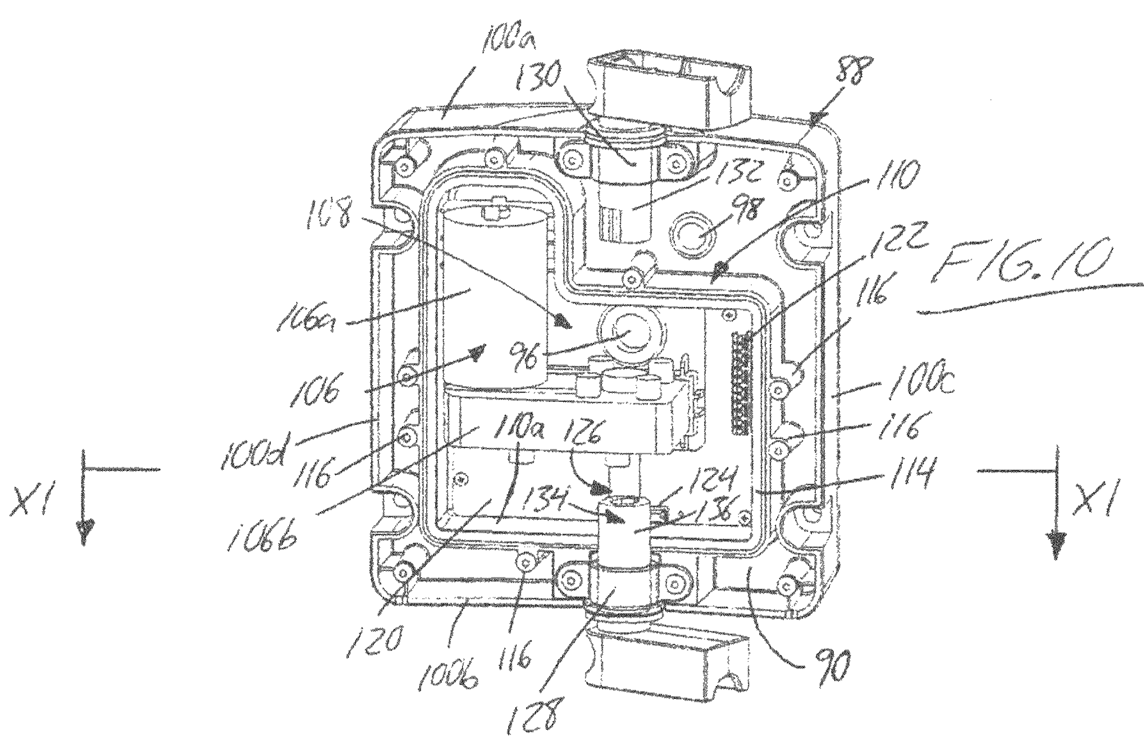
100a
130
88
132
98
110
108
122
F1G.10
106a
116
96
106
100c
100d
110a
126
116
116
124
114
X1
134
136
X1
106b
120
116
90
100b
128

12
88
16
86
STOP 16
12
86
88
STOP

SCHOOL BUS STOP ARM AND DRIVE UNIT THEREFOR

CROSS-REFERENCE TO RELATED APPLICATIONS

This application is a continuation of U.S. application Ser. No. 18/970,467, filed Dec. 5, 2024, which is a continuation of U.S. application Ser. No. 18/481,888 filed Oct. 5, 2023, now U.S. Pat. No. 12,358,425, issued Jul. 15, 2025, which is a continuation of U.S. application Ser. No. 18/057,654, filed Nov. 21, 2022, now U.S. Pat. No. 11,820,283, issued Nov. 21, 2023, which is a continuation of U.S. application Ser. No. 17/259,876, filed Jan. 12, 2021, now U.S. Pat. No. 11,554,715 issued Jan. 17, 2023, which is a 371 of international application PCT/CA2019/050968, filed Jul. 12, 2019, which, in turn, claims the benefit of U.S. Provisional application Ser. No. 62/697,974 filed Jul. 13, 2018, and U.S. application Ser. No. 62/758,095, filed Nov. 9, 2018, the disclosures of which are hereby incorporated in their entirety by reference herein.

TECHNICAL FIELD

The present disclosure relates generally to stop arms for school buses, and more particularly to stop arms with illuminated signs and drive control units for moving stop arms between their deployed and retracted positions on the side of a school bus.

BACKGROUND

School bus stop arms are deployed to indicate to other motorists the need to stop while the school bus loads and unloads passengers. In many jurisdictions, such stop arms are a legal requirement. The stop arms are typically mounted on a driver's side of the school bus and deployed from a retracted position near the school bus wall to a deployed position extending from the wall. Power from the electrical system of the vehicle may be used to supply power to the stop arm. In some cases, stop arms may be operated using compressed air.

SUMMARY

In some embodiments according to the present disclosure, there is provided a stop arm for a school bus comprising: a stop sign; and a drive unit mountable to a side of the school bus for selectively moving the stop sign between a deployed position and a retracted position, said drive unit comprising: a motor operably coupled to the stop sign to perform said selective movement, one or more position sensors operable to detect the presence of the stop sign in the deployed and retracted positions, and a controller operably coupled to the motor for controlling operation of the motor, the controller configured to, during operation of the motor, (i) monitor one or more operating characteristics of the motor for conditions indicative of an obstruction to movement of the stop sign, (ii) monitor the position sensor for a confirmation signal indicative of the presence of the stop sign in the deployed or retracted position, and (iii), based on the conditions indicative of an obstruction and the confirmation signal, determine if the stop sign has reached one of the deployed and retracted positions or is being obstructed.

In some embodiments of the present disclosure, there is provided a stop arm for a school bus comprising: a stop sign; and a drive unit mountable to a side of the school bus for selectively moving the stop sign between a deployed position and a retracted position, said drive unit comprising: a motor operably coupled to the stop sign to perform said selective movement, a controller operably coupled to the motor for controlling operation of the motor, and a housing defining an interior space of said housing and an enclosed sub-compartment divided from a remainder of the interior space, the motor being positioned within the sub-compartment, wherein at least one of: (a) a position sensor operable to detect the presence of the stop sign in one or more positions is contained within said sub-compartment; (b) a PCB, on which the controller and/or the position sensor are mounted, is contained within said sub-compartment; and (c) a motor-driven output shaft extends from the sub-compartment in a downward direction through a lower wall of said sub-compartment.

In some embodiments of the present disclosure, there is provided a stop arm for a school bus comprising: a stop sign with at least one light incorporated thereon; and a drive unit mountable to a side of the school bus for selectively moving the stop sign between a deployed position and a retracted position, said drive unit having a housing containing: a motor operably coupled to the stop sign to perform said selective movement, a controller operably coupled to the motor for controlling operation of the motor and operably coupled to the at least one light for selectively controlling illumination of the at least one light in a flashing mode or a strobing mode, wherein selection of the flashing mode or the strobing mode is made by closure of a circuit accessible from an exterior of the housing when the housing is assembled.

In some embodiments of the present disclosure, there is provided a stop arm for a school bus comprising: a stop sign; and a drive unit mountable to a side of the school bus for selectively moving the stop sign between a deployed position and a retracted position, said drive unit comprising a motor operably coupled to the stop sign to perform said selective movement, and a loading device coupled to the motor and configured to physically load the motor and increase the force needed to be overcome to move the sign when the drive unit is in an unpowered state.

In some embodiments of the present disclosure, there is provided a stop arm for a school bus comprising: a stop sign; and a drive unit mountable to a side of the school bus for selectively moving the stop sign between a deployed position and a retracted position, said drive unit comprising: a controller for controlling operation of the stop arm, and an energy storage device operably coupled to the controller, the controller configured to direct energy from the energy storage device for use in operation of the stop arm.

In some embodiments of the present disclosure, there is provided a stop arm for a school bus comprising: a stop sign with one or more illumination elements; and a drive unit mountable to a side of the school bus for selectively moving the stop sign between a deployed position and a retracted position, said drive unit comprising: a motor operably coupled to the stop sign to perform said selective movement, and a controller operably coupled to the motor and the stop sign for controlling operation of the motor and for controlling illumination of the one or more illumination elements, wherein the controller is configured to reduce a brightness of the one or more illumination elements during operation of the motor to move the sign between the deployed and retracted positions.

In some embodiments of the present disclosure, there is provided a stop arm for a school bus comprising: a stop sign; and a drive unit mountable to a side of the school bus for selectively moving the stop sign between a deployed position and a retracted position, said drive unit comprising a controller for controlling operation of the stop arm, wherein the controller is configured to monitor a voltage of a signal from the school bus and periodically load the signal if the voltage is within a predetermined range in order to determine if the signal is an intended control signal.

In some embodiments of the present disclosure, there is provided a stop arm for a school bus comprising: a stop sign; and a drive unit mountable to a side of the school bus for selectively moving the stop sign between a deployed position and a retracted position, said drive unit comprising: a motor operably coupled to the stop sign to perform said selective movement, and a controller operably coupled to the motor for controlling operation of the motor, wherein the controller is configured to detect a nominal voltage of an electrical system of the school bus and, based on the detected nominal voltage, adjust a threshold voltage of a control signal required to initiate deployment of the stop sign.

In some embodiments of the present disclosure, there is provided a stop arm for a school bus comprising: a stop sign; and a drive unit mountable to a side of the school bus for selectively moving the stop sign between a deployed position and a retracted position, said drive unit comprising: a motor operably coupled to the stop sign to perform said selective movement, and a controller operably coupled to the motor for controlling operation of the motor, wherein the controller is configured to monitor one or more parameters influencing a time required to move the stop sign between the deployed and retracted positions, and to adjust control of the motor based on the one or more monitored parameters so that the time required to move the stop sign between the deployed and retracted positions is within a predetermined range.

In some embodiments of the present disclosure, there is provided a stop arm for a school bus comprising: a stop sign comprising a sign assembly including: at least one stop insignia, each stop insignia comprising a respective written stop message on a backdrop surrounding said respective written stop message, and at least one internal illumination device installed within said sign assembly and configured to backlight both the respective written stop message and the respective backdrop upon activation of said internal illumination device; and a drive unit mountable to a side of the school bus for selectively moving the stop sign between a deployed position and a retracted position.

BRIEF DESCRIPTION OF THE DRAWINGS

Embodiments of the present disclosure will now be described in conjunction with the accompanying drawings in which:

FIG. 9 is a front view of a drive unit housing of the bus stop arm of FIG. 1 or FIG. 7 with a front shell thereof removed to reveal internal components of the drive unit.

FIG. 10 is a front view of the drive unit of FIG. 9 with a compartment cover thereof removed to reveal mounting of a motor assembly of the drive unit within an enclosed sub-compartment of the drive unit housing.

DETAILED DESCRIPTION

Figure 1:
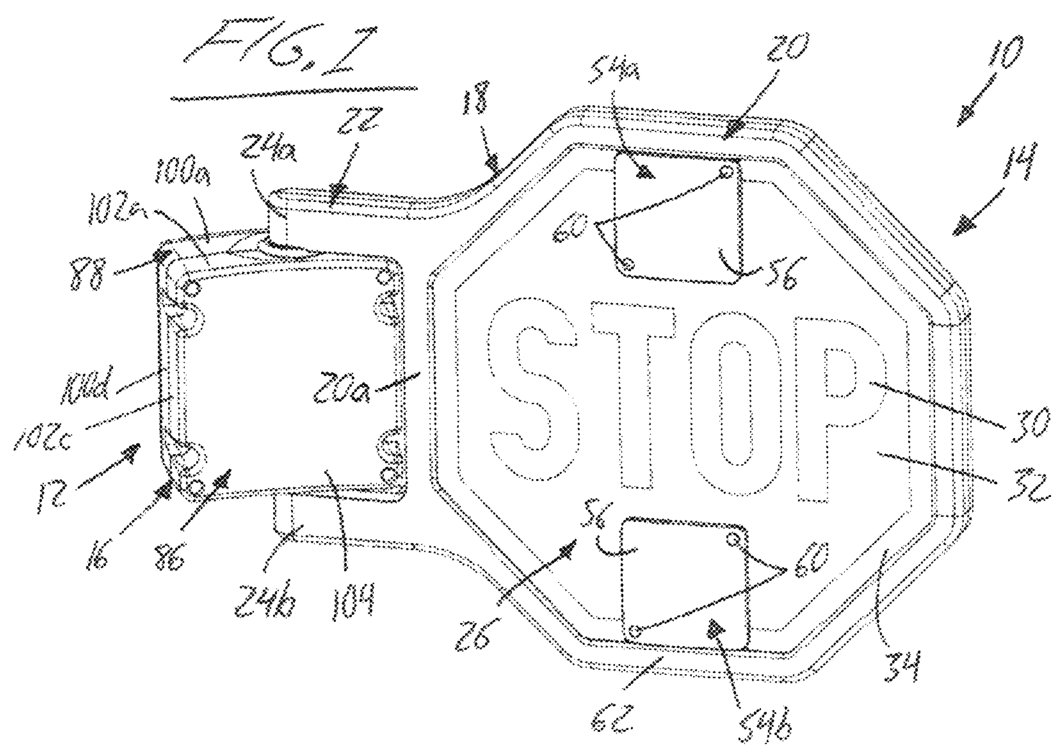
FIG. 1 is a top front perspective view of an illuminated, flasher-equipped school bus stop arm according to a first embodiment of the present disclosure.
Figure 2:
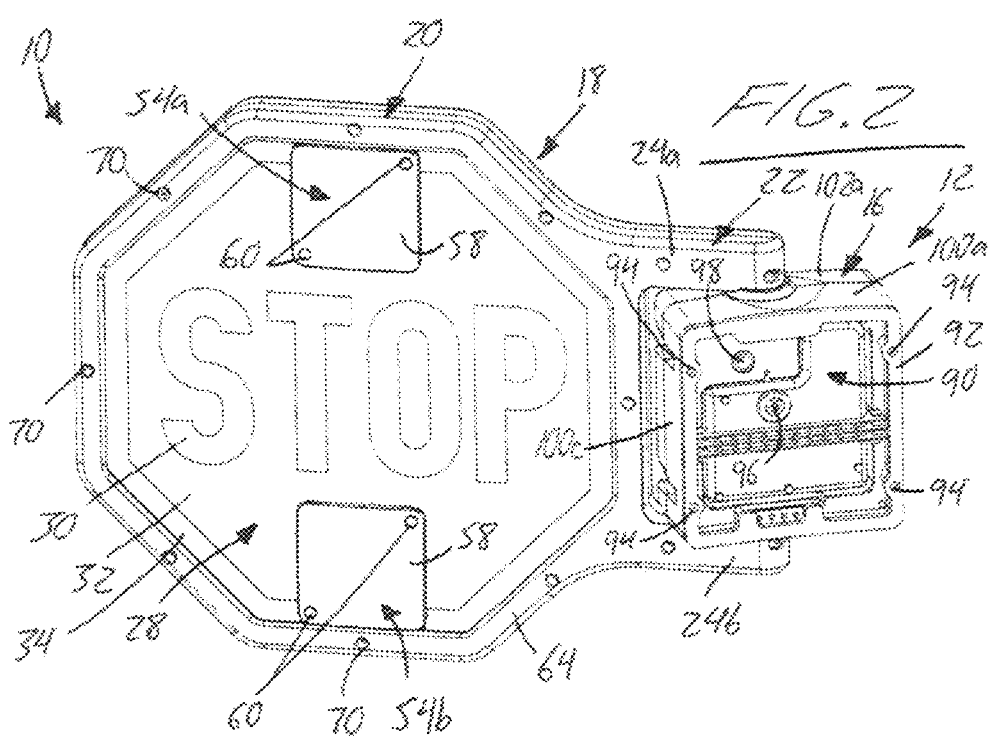
FIG. 2 is a top rear perspective view of the school bus stop arm of FIG. 1.

FIGS. 1 and 2 illustrate a first embodiment of the present disclosure, in which a school bus stop arm 10 features a drive unit 12 on which an illuminated stop sign 14 is movably carried for pivotal motion relative thereto about a vertically upright pivot axis for movement between a deployed position and a retracted position. A housing 16 of the drive unit doubles as both a mount by which the stop arm is attachable to the exterior side wall of a school bus, and a protective enclosure for internal components of the drive unit. The drive unit 12 is operable to selectively pivot the illuminated stop sign 14 between the deployed and retracted positions. The stop sign of the installed stop arm lies generally parallel to the side wall of the bus in contact or close proximity thereto when in the retracted position, and reaches laterally outward from the side wall of the school bus in generally perpendicular relation thereto when in the deployed position. The vertical planes in which retracted and deployed positions of the illuminated stop sign are thus disposed at approximately 90-degrees to one another.

The illuminated stop sign features a frame 18 having an octagonal sign section 20 and a dual-armed support section 22 featuring a pair of parallel support arms 24*a*, 24*b* emanating outward from a vertical segment 20*a* of the octagonal sign section nearest to drive unit housing 16. The other seven segments of the sign section 20 cooperate with this housing-adjacent vertical segment 20*a* to denote the overall octagonal shape of the sign section, and to delimit a hexagonal open space thereof in which one or more stop lamp assemblies are installed to provide the stop sign with an illuminating functionality.

The illustrated embodiment is particularly useful as a front stop arm of a school bus, and thus features a double-sided stop sign having a first stop insignia 26 disposed within the octagonal space delimited by the sign section 20 of the frame 18 and visible from a first or front side of the sign, and a matching second stop insignia 28 likewise disposed within the octagonal space of the frame's sign section and visible from an opposing second or rear side of the sign. The two stop sign insignia's thus reside and face oppositely of one another in the octagonal space of the frame 18 so as to be visible from opposing directions. Each stop insignia features a written stop message 30 presented in white block lettering spelling out the word "STOP" in all capital letters, a red backdrop area 32 surrounding the written stop message 30, and a white perimeter border 34 spanning around the red backdrop area on an octagonal path just inside the octagonal sign section of the frame 18. The written stop messages of the first and second stop insignias are arranged facing opposite sides of the sign so as to read properly from the front and rear sides of the sign, respectively. In the deployed position of the stop sign, the first stop insignia faces toward the front end of the school bus, while the second stop insignia faces toward the rear end of the school bus. In the retracted position of the stop sign, the first stop insignia faces laterally outward from the side wall of the school bus, while the second stop insignia faces inwardly toward the side wall of the school bus.

Figure 3:
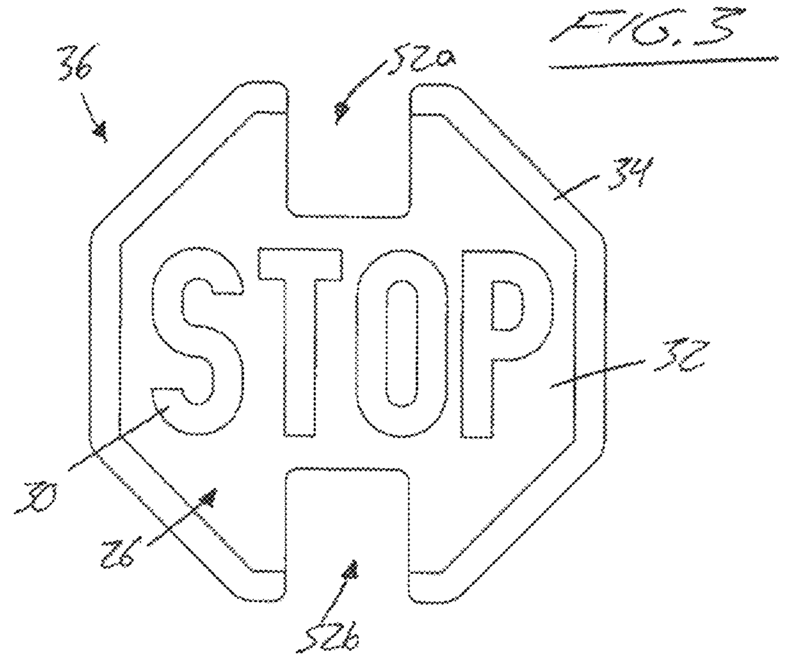
FIG. 3 is a front elevation view of a stop lamp assembly from the school bus stop arm of FIGS. 1 and 2.

The illustrated embodiment employs a dual stop lamp construction, in which each stop insignia is individually illuminated by a respective illumination device. FIG. 3 illustrates one of the stop sign's two stop lamps, particularly a first stop lamp 36 that respectively illuminates the first stop insignia at the front side of the stop sign. In the instant embodiment, the written stop message, red backdrop area and white perimeter border of the stop insignia 28 are printed on a first lens 38 of the first stop lamp 36, for example on a rear side thereof. Behind this first lamp lens 38, adjacent the rear side thereof, is a first light diffusion panel 40, for example made of acrylic, which underlies an entirety of both the written stop message and the red backdrop area of the first stop insignia printed on the first lamp lens 38. This first light diffusion panel 40 preferably underlies at least an inner portion of the white perimeter border 34 that immediately neighbours the red backdrop area, and may underlie an entirety or substantial majority of the white perimeter border 34. Behind the first light diffusion panel 40, adjacent the rear side thereof opposite the first lamp lens, is a first reflector 42 having a reflective front face spanning an entirety, or near entirety, of the first light diffusion panel 40. This way, light emitted from the rear side of the first light diffusion panel 40 is reflected forwardly back into the first light diffusion panel for emission through the first lamp lens. A first back plate 44 resides behind the first reflector 42, and has mounted thereon one or more first sets of light sources 46 each appropriately positioned for alignment with a respective segment of an outer perimeter edge of the first light diffusion panel. Preferably each set of light sources is a strip of LEDs.

Figure 4:
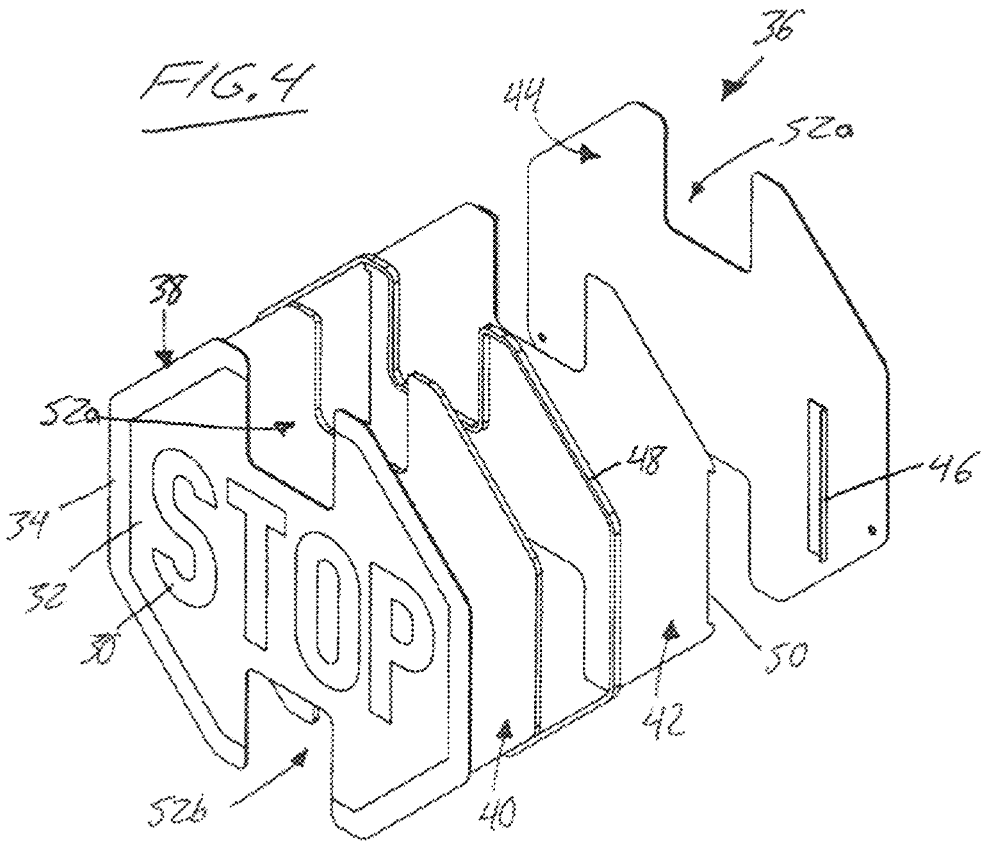
FIG. 4 is an exploded front perspective view of the stop lamp assembly of FIG. 3.

The first lamp lens 38, first light diffusion panel 40, first reflector 42 and first back plate 44 are sandwiched together, and held in sandwiched relation by a first adhesive seal 48 applied between the rear side of the first lamp lens and the front side of the first back plate 44 on a path spanning around the perimeter of the first light diffusion panel 40 and first reflector 42. To accommodate such placement of the first seal 48, the first light diffusion panel 40 and first reflector 42 are preferably of slightly smaller size than the first lamp lens 38 and first back plate 44. As shown at 50 in FIG. 4, the outer perimeter of the first reflector 42 may be notched out at any segment thereof that corresponds to a matching edge segment of the first diffusion panel that is to be illuminated by a respective first set of light sources. Such notching of the first reflector 42 accommodates reaching of said light sources forwardly past the first reflector to the matching edge segment of the first diffusion panel 40. In the instant embodiment, the first lamp lens, first diffusion panel, first reflector and first back plate of the first stop lamp each have six linear perimeter edges lying on six segments of an octagonal shape. The remaining two perimeter edges at the top and bottom of these otherwise octagonal stop lamp components deviate from linear form and instead have notched cutouts 52*a*, 52*b* that reach inwardly from the otherwise octagonal perimeters of these lamp components, for reasons set out further below.

The first diffusion panel 40 is edge-lit by the one or more first sets of light sources 46 to cast uniform illumination over a full area of the diffusion panel's front side, thus forming a first illumination device that fully and uniformly back-lights the entirety of the written stop message 30 and surrounding red backdrop area 32 of the first stop insignia printed on the first lamp lens 38. The written stop message 30 and surrounding red backdrop area 32 are non-opaque, and are thus illuminated by the first diffusion panel 40 when the one or more first sets of light sources 46 are activated. If the one or more first sets of light sources are not concealed by the sign section 20 of the frame 18, but are positioned behind the white perimeter border 34 of the stop insignia, then the white perimeter border may be opaque, or at least of greater opacity that the more transparent/translucent stop message and backdrop area so that direct visibility of the light sources is reduced or altogether eliminated. Alternatively, the one or more first sets of light sources may be positioned sufficiently far outward on the first back plate 44 to be concealed behind an in-turned flange of the sign section of the frame that juts inwardly over the exterior face of the lens in the fully assembled state of the illuminated stop sign. In such instance, the white perimeter border 34 need not be opaque, and may have transparency/translucency so that the inner area thereof left uncovered by the in-turned flange of the frame 18 is also illuminated by the first diffusion panel 40.

In the illustrated two-lamp embodiment, the second stop lamp 36' has the same sandwiched assembly of components as described above for the first stop lamp, and thus features a printed second lamp lens embodying the second stop insignia 28, a second light diffusion panel situated adjacent the second lamp lens at a front side thereof, a second reflector with a reflective rear side situated adjacent the second light diffusion panel at the front side thereof, and a second back plate 44' that resides adjacent the second reflector at the front side thereof. The second back plate 44' has one or more second sets of light sources (e.g. LED strips) mounted thereon and each appropriately positioned for alignment with a respective segment of an outer perimeter edge of the second light diffusion panel. As an alternative two having two back plates 44, 44', one for each stop lamp, the two stop lamps may alternatively share a single back plate 44 with the reflectors and light sources of the two stop lamps situated on opposing sides of the shared back plate. Activating the light sources of each stop lamp thus illuminates the respective one of the two stop insignia's.

In an alternative embodiment likewise featuring a double-sided stop sign having two stop insignia's on opposing sides thereof, a single illumination device may instead illuminate both of the stop insignias. This single illumination device may be provided in the form of a single edge-lit light diffusion panel disposed between the two lamp lenses on which the insignia's are printed. Such embodiment may be considered a double-sided single-lamp embodiment, where a single stop lamp has two opposing lamp lenses at opposite sides of the stop sign that are both illuminated by a singular shared illumination device, whereas the first embodiment is a double-sided dual-lamp embodiment employing two one-sided stop lamps each having a respective lamp lens and respective illumination device for emitting light in a single direction from a respective single side of the stop sign.

Another embodiment may feature a single one-sided stop lamp operable to illuminate a stop sign insignia at the front side of the stop sign, while lacking any illumination function at the opposing rear side of the stop sign. Such single-sided embodiment may be used as a rear stop arm of a school bus on which there is also a double-sided front stop arm mounted closer to the front end of the school bus. In such instance, the rear stop arm is mounted in a position such that its insignia-equipped lamp-illuminated front side faces rearwardly of the bus in the deployed position to warn traffic behind the bus. The non-illuminated rear side of the single-sided stop sign that faces forwardly of the bus in the deployed position may be absent of any stop insignia, or may have a non-illuminated stop insignia thereon, if regulations allow for such.

School bus regulations in at least some jurisdictions require that if the stop insignia of a stop arm is not retroreflective, then the stop sign incorporate flashing lights thereon, typically in the form of flashers on each side of stop arm mounted respectively near the top and bottom of the stop sign and configured to flash in an alternating pattern. In the illustrated stop arm of FIGS. 1 and 2, the stop insignias printed on the two lenses are not retroreflective, and so the stop sign incorporates flasher lights. The illustrated embodiment shows doubles-sided flashers, namely an upper flasher 54*a* mounted in the upper cutouts 52*a* of the stop lamp components and a lower flasher 54*b* mounted in the lower cutouts 52*b* of the stop lamp components. Each double-sided flasher 54*a*, 54*b* features a front flasher lens 56 mounted over the first stop lamp lens, a rear flasher lens 58 mounted over the second stop lamp lens. A light source of each flasher is contained between the two flasher lenses in the cutout space 52*a*, 52*b* of the stop lamps (or stop lamp, in the case of a double-sided single-lamp embodiment). It will be appreciated that the terms "lamp lens" and "flasher lens" are being used only to avoid confusion between which lens is being referred to, and is not intended to denote any particular composition, construction or other specific detail to either lens.

In the illustrated embodiment, the two flasher lenses 56, 58 of each flasher are held in place by fastening thereof together through the cutout space 52*a*, 52*b* of the stop lamps by threaded fasteners 60 that draw the flasher lenses toward one another to respectively clamp them in place against the two lamp lenses. This way, neither the stop lamps nor the stop sign frame require any mounting bosses or other features into which the flasher fasteners 60 can be threaded, and so very simple flat panel lamp lenses can be used for the stop lamps. However, in other embodiments, single-sided flashers could alternatively be mounted individually to opposing sides of the stop sign, for example mounted to the respective lamp lenses of the two stop lamps or mounted to top and bottom segments of the frame's sign section 20.

While double-sided flashers are shown in the illustrated embodiment, other embodiments may use four single-sided flashers, two one each side of the stop sign. The single-sided flashers would incorporate a front lens covering a PCB substrate with LED lights thereon, with two single-sided flashers placed back to back in the cutouts.

Figures 5, 6A:
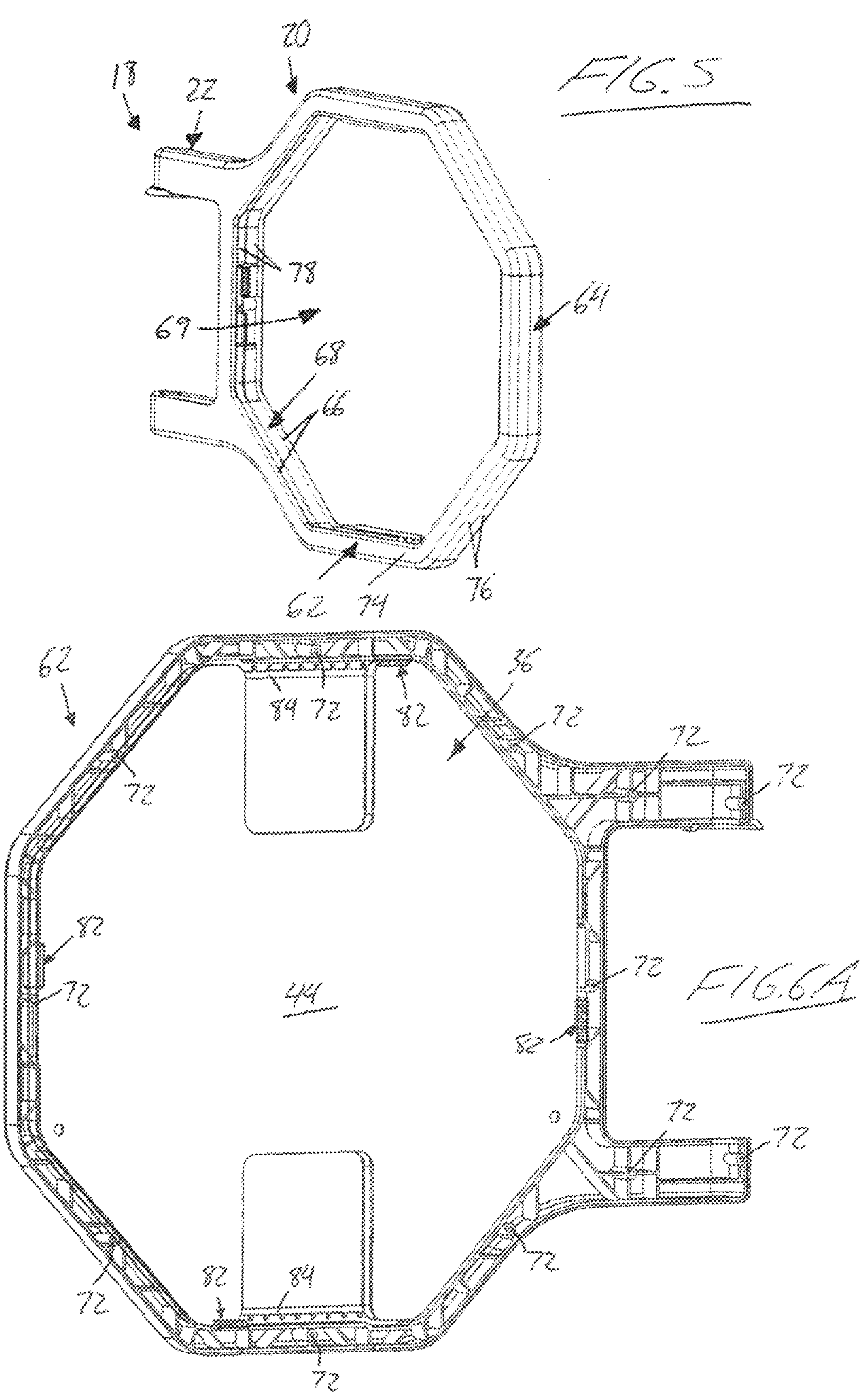
FIG. 5 is an isolated perspective view of a frame of the school bus stop arm of FIG. 1.
FIG. 6A is a perspective view of a first frame component of the frame of FIG. 5, illustrating snap fit placement of a first stop lamp assembly therein during assembly of the school bus stop arm.

FIG. 5 shows an isolated view of the frame 18 from FIGS. 1 and 2. The frame 18 is assembled from two plastic molded frame components 62, 64 that mate together face-to-face in a thickness dimension of the stop sign in which the front and rear sides of the sign are spaced apart. Each frame component 62, 64 occupies a respective half of the frame thickness over the entire sign section 20 and entire support section. Accordingly, each frame component 62, 64 has an octagonal sign portion and a dual-arm support portion that respectively mate with those of the other frame component to complete the overall sign and support sections 20, 22 of the frame 18. The first frame component 62 thus denotes the front side of the assembled stop sign, while the second frame component 64 denotes the rear side of the assembled stop sign. At an external face of each frame component furthest from the other frame component, the octagonal sign portion of each frame component features an in-turned flange 66 that juts a short distance inwardly over the respective stop lamp lens to partially overly the white perimeter border 34 thereof. As mentioned above, this in-turned flange 66 may be in overlying relation to the light sources of the respective stop lamp in order to fully obstruct a direct sight-line thereof through a transparent or translucent white perimeter border, though as also mentioned, the light sources may alternatively be obstructed or obscured by a more opaque white perimeter border.

Still referring to FIG. 5, when internal faces of the two frame components 62, 64 are placed or mated together, the octagonal sign portions of the frame components cooperatively define a U-shaped channel 68 that spans around and opens inwardly into the octagonal space 69 bound by the sign section of the frame. The in-turned flanges 66 of the two frame components define opposing sides of this U-shaped channel, in which the outer peripheral edge of each stop lamp is received in the assembled state of the sign. As shown in FIG. 2, the external face of one of the frame components (the second frame component at the rear of the sign in the illustrated example) has fastener holes 70 therein that reach fully through the frame component to the opposing interior face thereof at spaced apart positions along the octagonal segments of the sign section and along the parallel arms of the support section in order to enable engagement of threaded fasteners into matching fastener bosses at the internal face of the other (first) frame component.

Figures 6B, 6C:
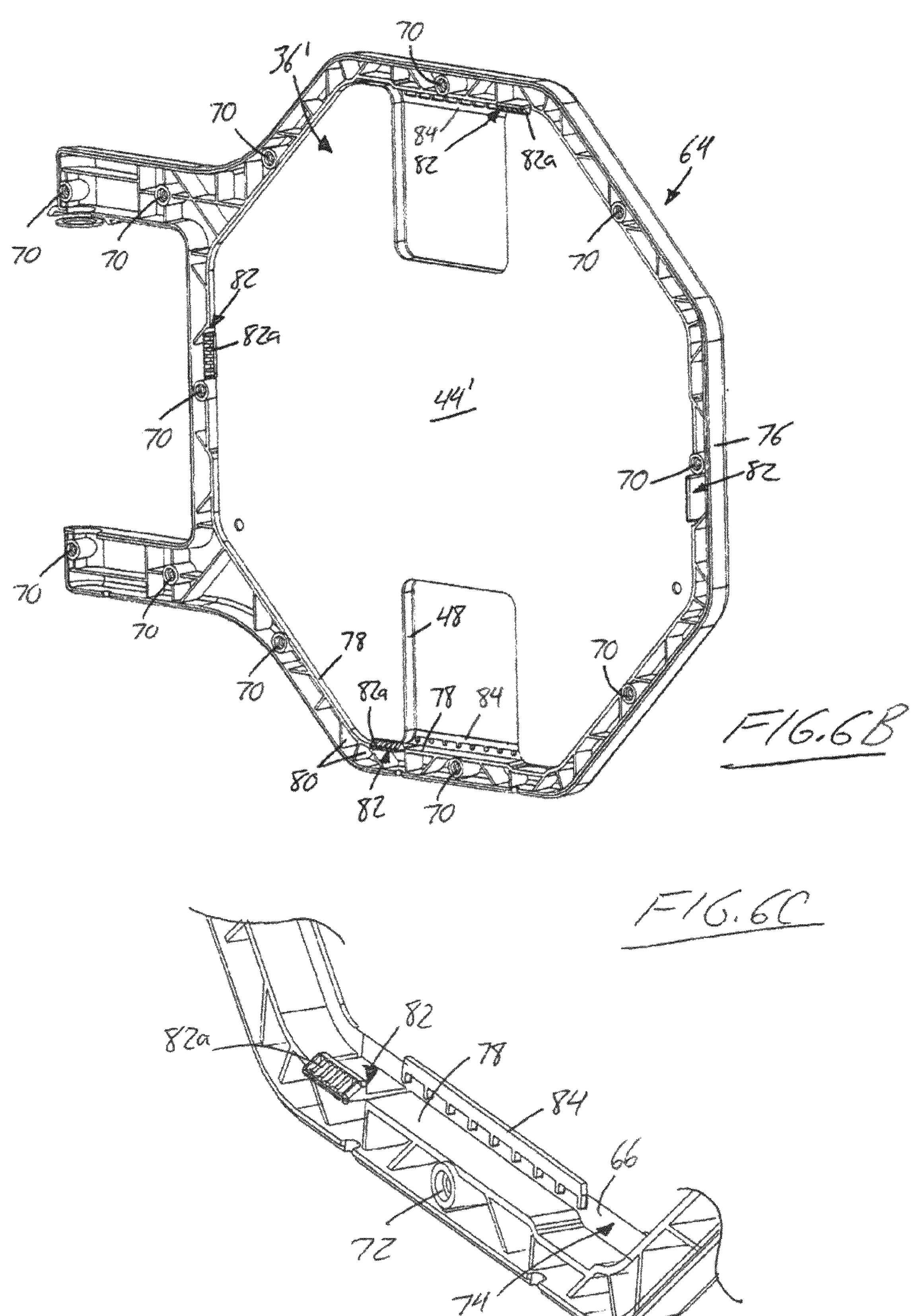
FIG. 6B is a perspective view of a second frame component of the frame of FIG. 5, illustrating snap fit placement of a second stop lamp assembly therein during assembly of the school bus stop arm.
FIG. 6C is a partial closeup view of the frame component of FIG. 6B illustrating one of the snap tabs thereof for retaining the inserted stop lamp assembly.

FIGS. 6A through 6C, illustrate how each second frame component is configured for snap-fit placement of the respective stop lamp therein. Each frame component's octagonal sign portion features an exterior facial wall 74 that defines the exterior face thereof, an outer peripheral wall 76 that lies perpendicular to the exterior facial wall 74 at an outer edge thereof and spans to the opposing interior face of the frame component, and an inner peripheral wall 78 that likewise spans to the interior face of the frame component in parallel relation to the outer peripheral wall 76 at a distance inward therefrom. A portion of the exterior facial wall 74 reaching inwardly past the inner peripheral wall 78 defines the in-turned flange 66 of the frame component. Reinforcement webs 80 span between the inner and outer peripheral walls 76, 78 to maintain rigid spacing therebetween. The internal face of each plastic frame component is open, leaving hollow cavities between the peripheral walls and reinforcement webs 80. When the two frame components 62, 64 are mated together at their interior faces, their inner peripheral walls 76 meet one another end-to-end and cooperatively define the bottom of the U-shaped channel 68 between the in-turned flanges 66 of the two frame components 62, 64.

At spaced positions around the octagonal sign portion of each frame component 62, 64, a series of flexible snap tabs 82 project from the exterior facial wall 74 in the same direction as the inner peripheral wall 78 at a series of gaps left therein. A tapered catch 82*a* on each flexible snap tab 82 resides adjacent a distal end thereof that resides furthest from the exterior facial wall 74 and beyond the plane of the internal face of the frame member. Each tapered catch 82*a* has a ramped inner side that faces inwardly of the octagonal space 69 of the frame 18. The slopes of this ramped inner side increases the thickness of the tapered catch 82*a* from a minimum at the distal end of the catch tab to a maximum at a location matching the terminal end of the inner peripheral wall 78 that resides opposite the exterior facial wall 74. This thicker end of the tapered catch 82*a* on each snap tab 82 resides inwardly of the inner peripheral wall 78 so as to interfere with attempted insertion of the respective stop lamp into the octagonal receiving space delimited by the inner peripheral wall 78. However, pushing the stop lamp against the ramped sides of the tapered catches 82*a* with sufficient force from the interior side of the frame member causes the snap tabs 82 to temporarily flex outwardly and permit such insertion of the stop lamp into the octagonal receiving space. Once the stop lamp clears the thicker ends of the tapered catches, the resiliently flexible snap tabs 82 snap back into their normal positions so that the tapered catch 82*a* of each snap tab 82 now hooks over the perimeter of the stop lamp's back plate 44, 44'. The stop lamp is thus securely retained between the in-turned flange 66 of the frame component and the tapered catches 82*a* of the snap tabs 82.

FIG. 6C shows a partial closeup of the frame component 64 of FIG. 6B, better revealing one of the snap tabs 82 thereof at a gap in the inner peripheral wall 78 of the frame component. The figure also shows how the exterior facial wall 74 may feature an extension ledge 84 at the top and bottom segments of the octagonal sign portion of the frame member. The extension ledge 84 is attached to the interior side of the exterior facial wall 74 and reaches inwardly past the free end of the in-turned flange 66 into the cutout of the stop lamp lens in order to receive placement of an edge of the respective flasher lens 58 during installation of the upper and lower flashers 54*a*, 54*b* in the cutout spaces 52*a*, 52*b* of the lamps.

This provides a simple and convenient assembly of the stop sign, where the two lamps are effectively stop sign inserts that simply snap fit into the octagonal receiving spaces of their respective frame components from the interior sides thereof so that their respective stop insignias are visible through the octagonal openings delimited by the in-turned flanges at the exterior faces of the frame components. The two frame components are then fastened together by driving threaded fasteners through the fastener holes 70 in one frame component 64 into the matching fastener bosses 72 in the other frame component. The flashers are then easily added by fastening together the two flasher lenses of each double-sided flasher through the respective upper or lower cutout spaces 52*a*, 52*b* of the stop lamps. A single-lamp embodiment could similarly benefit in case of assembly from snap-fit receipt of its single lamp in a respective frame component, to which a mating frame component lacking its own respective lamp could then fastened to sandwich the lamp between the two frame components. Non-illuminated embodiments could also benefit from the case of snap fit assembly, where one or two sign inserts are similarly snap fit into one or both frame components, which are then fastened to a mating component to sandwich the insert(s) between the in-turned flanges of the two frame components.

In some embodiments, the snap tabs may be omitted or replaced with other securing means, such as screw mounted latches that are screwed into place and retain the stop lamp following its placement into the octagonal frame.

Figure 7:
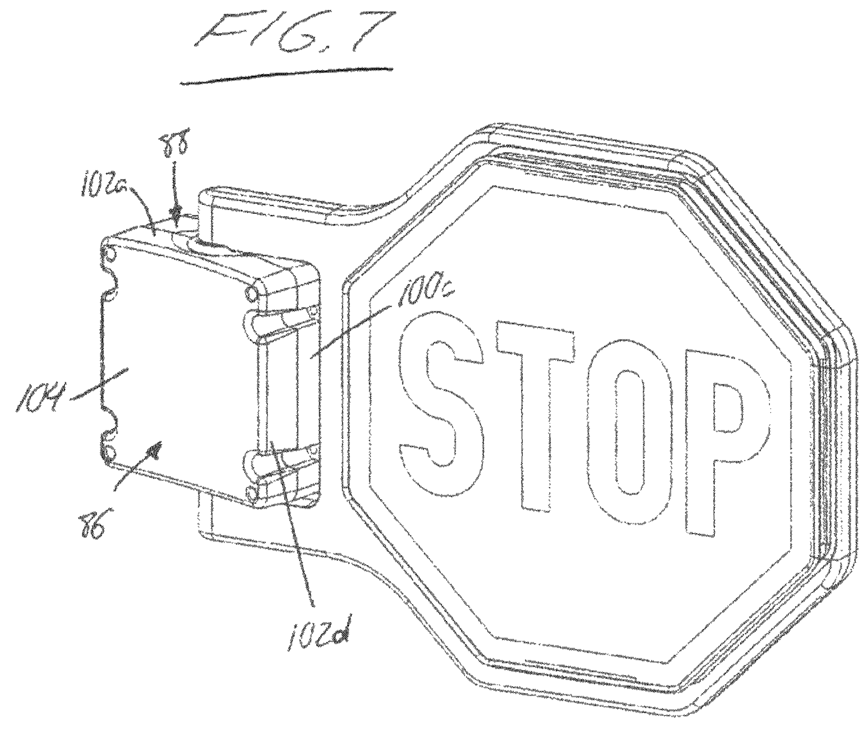
FIG. 7 is a top front perspective view of an illuminated flasherless school bus stop arm according to a second embodiment of the present disclosure.
Figure 8:
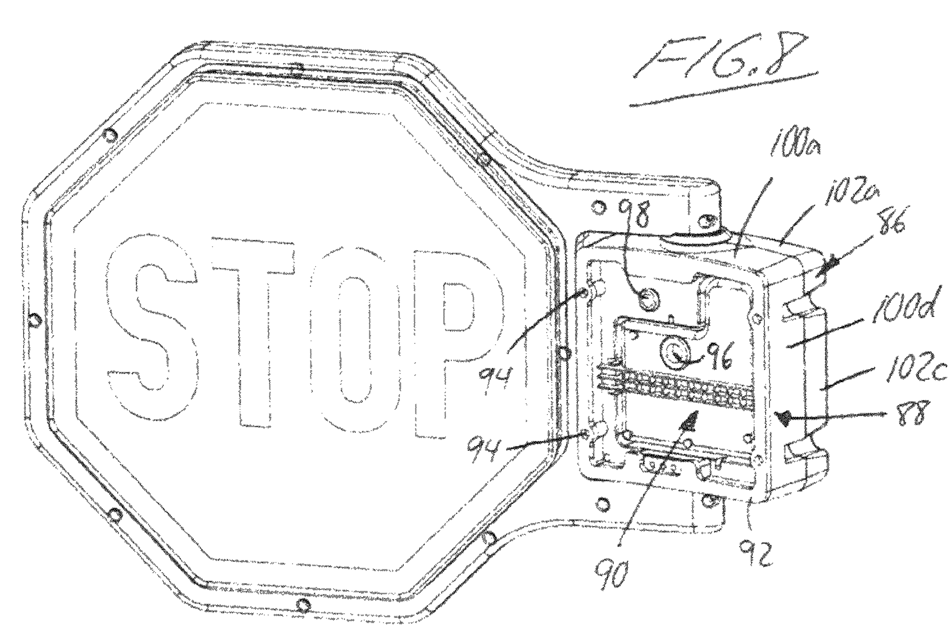
FIG. 8 is a top rear perspective view of the school bus stop arm of FIG. 7.

FIGS. 7 and 8 illustrate a second embodiment of the stop arm, which once again is a double-sided dual-lamp stop arm, but incorporates retroreflective stop insignias in the lamp assemblies, and therefore omits the flashers of the first embodiment. Instead of the stop insignias being printed directly on the lenses, each stop insignia is instead embodied on one or more retroreflective films adhered to the exterior face of the lamp lens of the respective lamp. In this embodiment, no cutouts are required in the lamp components to accommodate mounting of the flashers, and so the lamp components of each lamp instead employ a more fully intact octagonal shape with eight fully or substantially linear segments, though as indicated previously, the reflector of each lamp may have a shallower notch or cutout 50 in one or more sides to accommodate the reach of backplate-mounted LEDs or other light sources into edge-lit relation with the respective light diffusion panel. Other than the lack of stop lamp cutouts and the substitution of retroreflective stop insignias, the second embodiment is otherwise the same as the first embodiment, and may be varied in the same ways contemplated above. Once again, the white perimeter border may be of greater opacity than the stop message and red backdrop area that have sufficient transparency or translucency for backlit illumination thereof by the edge-lit diffusion panel of the lamp. While edge-lighting of the diffusion panel is preferred in the interest of reducing an overall thickness of the stop sign, the diffusion panel may instead be backlit in other embodiments.

Having described the structure of the illuminated stop sign of the school bus arm in detail, attention is now turn to the structure and operation of the drive unit by which the stop sign is movable between the deployed and retracted positions. The housing comprises a two-piece outer shell composed of a front shell 86 and a mating rear shell 88. A rear wall 90 of the rear shell 88 has a gasket 92 situated externally thereon along an outer perimeter thereof for sealed engagement of the rear wall of the rear shell against the side wall of a school bus in order to mount the drive unit and the attached stop sign to the bus via suitable fastener holes 94 distributed at spaced positions around the perimeter of the rear shell's rear wall 90. The perimeter of the rear side of the rear shell is raised relative to a sunken central area thereof in which there are provided a pair of wire-routing holes 96, 98 for connection of electrical wiring between the school bus, the drive unit and the stop sign. The rear shell 88 of the housing has a set of outer peripheral walls 100*a*-100*d* spanning forwardly from the rear wall 90 in perpendicular relation thereto, and connected together end to end to delimit an interior space of the rear shell. At distal ends furthest from the rear wall, the outer peripheral walls of the rear shell delimit an open front side thereof.

The front shell 86 is of similar configuration to the rear shell, having an interior space delimited between a set of peripheral walls 102*a*-102*d* that connect end-to-end and project perpendicularly from a front wall 104 that denotes a closed front side of the shell lying opposite an open rear side thereof. In the illustrated embodiment, each shell is of rectangular shape, thus having four outer peripheral walls connecting at right angles around the perimeter of a rectangular front or rear wall of the shell, but it will be appreciated that the particular shape of the shells may be varied.

FIGS. 9 and 10 illustrate the drive unit with the front shell thereof removed to reveal internal details of the drive unit. As shown in FIG. 10, a geared motor assembly 106 featuring a brushed encoderless DC electric motor 106*a* and attached gear box 106*b* is disposed within an enclosed sub-compartment 108 that is separated from a remainder of the overall interior space of the drive unit housing 16, as collectively delimited by the front and rear shells 86, 88 thereof. The sub-compartment 108 features a set of perimeter walls 110 projecting perpendicularly forward the internal side of the rear shell's closed rear wall toward the open front side of the rear shell. The illustrated sub-compartment 108 has a generally L-shape, with an upright leg accommodating an upright orientation of the cylindrical DC motor 106*a* that stands upright from the gearbox 106*b* that lies horizontally within a lower horizontal leg of the sub-compartment's L-shape. As shown in FIG. 9, a compartment cover 112 of matching L-shape configuration fits over the sub-compartment 108 in mating relation with the perimeter walls 110 thereof to fully enclose the sub-compartment 108 in the assembled state of the drive unit 12. As shown in FIG. 10, a seal or gasket 114 overlies the distal end of the sub-compartment perimeter walls 110 furthest from the rear wall 90 of the rear shell 88 in order to create a fluid tight seal between the perimeter walls 110 of the sub-compartment 108 and the compartment cover 112 when installed thereover. A series of fastening bosses 116 distributed at spaced locations around the perimeter walls 110 of the sub-compartment 108 align with fastening flanges 118 disposed around the perimeter of the compartment cover 112 to receive threaded fasteners for securing the compartment cover 112 in its installed position enclosing the sub-compartment 108. The electric motor and other electronic components contained within the sub-compartment are thus substantially isolated from the remainder of the housing's interior space to minimize exposure to environmental elements. The front shell is fastened to the rear shell in overlying relation to the compartment cover, thus enclosing the overall interior space of the housing, including the areas thereof outside the sub-compartment.

In addition to the motor assembly 106, the enclosed sub-compartment 108 also contains a printed circuit board (PCB) 120 on which there are installed wire connection terminals 122, a controller (e.g. micro-controller) and a position sensor 124 that cooperates therewith for controlled and selective operation of the electric motor 106. The PCB 120 is fastened to the interior side of the rear shell's rear wall 90 so as to reside on an internal side of the sub-compartment 108 situated across the motor assembly 106 from the removable compartment cover 122. However, the illustrated PCB is also of complementary shape and position to the motor assembly so as to reside entirely outside the footprint thereof. The illustrated PCB has an L-shape configuration with an upright leg lying beyond a distal end of the gearbox 106*b* furthest from the motor 106, and a horizontal leg lying below the gearbox 106*b* at the bottom of the horizontal leg of the L-shaped sub compartment 108.

A driven output shaft 126 of the motor assembly reaches downwardly from the gearbox 106*b* near the distal end thereof, and passes through a shaft hole in a lower perimeter wall 110*a* of the sub-compartment, below which a lower bearing 128 is mounted inside the drive unit housing just above the mated-together bottom peripheral walls 100*b*, 102*b* of the housing shells 88, 86, respectively. A shaft opening in these bottom peripheral walls of the housing shells aligns with the lower bearing 128 in order to accommodate passage of a lower stub shaft there through to which output shaft 126 is in connected within the sub-compartment 108. At an exterior of the housing, the lower stub shaft connects to the lower support arm 24*b* of the stop sign frame 18 beneath the drive unit housing 16. Accordingly, operation of the motor 106*a* in opposing directions is possible to drive the output shaft 126 in opposing directions to move the stop sign back and forth between the deployed and retracted positions described above.

An upper bearing 130 is similarly mounted in the interior space of the housing above the enclosed sub-compartment 108 at an upper area thereof just below the mated-together top peripheral walls 100*a*, 102*a* of the housing shells 88, 86. This upper bearing 130 aligns with a shaft opening in these peripheral walls of the assembled housing shells. A stub shaft 132 passes through this upper shaft opening and the upper bearing 130 and connects to the upper support arm 24*a* of the stop sign frame at a location above the drive unit housing 16. The stub shaft 132 and motor-driven output shaft 126 lie on the same vertical axis, thus defining the vertical pivot axis about which the stop sign is pivotable between the deployed and retracted positions. The upper stub shaft 132 lacks any connection to the motor assembly 106, whereby the movement of the stop sign is driven solely through the output shaft 126 that is routed downwardly through the lower perimeter wall 110*a* of the sub-compartment 108 to the exterior environment outside the drive housing 16. Since only the lower support arm 24*b* of the stop sign frame 18 is operably coupled to the motor assembly 106, only a single shaft opening form the otherwise enclosed sub-compartment 108 is required. The placement of this shaft opening at the bottom of the sub-compartment 108 minimizes the chance of rainwater or other environmental contaminants gravitationally seeping into the sub-compartment 108 in the event such contaminants penetrate the outer shell of the drive unit housing 16.

A primary wire routing hole 96 penetrates the rear wall 94 of the rear shell 88 of the drive unit housing 16 at a location opening into the sub-compartment 108, for example at an area thereof that is situated above the gearbox 106*b* and unoccupied by the PCB 120. Wiring from the school bus, including power leads from the school bus's electrical system and signal lines from various electrical components thereof relevant to deployment and retraction of the stop arm (driver controls, door sensors, school bus loading flashers, etc.), is routed into the sub-compartment 108 via this primary wire routing hole 96 for connection to the terminals 122 on the PCB 120. As shown, the primary wire routing hole 96 is preferably grommeted to prevent weather penetration and avoid damage to the wiring when routing same into the housing unit during installation thereof on the bus. Illumination control wiring to the light sources of the one or more lamps and optional flashers of the illuminated stop sign may also be routed through primary wire routing hole 96 in order to exit the sub-compartment, within which these illumination control wires are connected to the controller on the PCB to selectively activate the stop sign illumination and optional flashers when the stop sign is deployed. The illumination control wiring is thus routed out of the sub-compartment 108 into the recessed central area at the exterior of the rear shell's rear wall 90, where it is then routed back into the housing through the secondary wire routing hole 98 at a location outside the sub-compartment 108. From here, this illumination control wiring is then routed through a hollow bore of the stub shaft 132 up into the upper support arm 24*a* of the stop sign frame 18, where the wiring is routed onward to the sign section 20 of the frame 18 and is connected to the light sources of the one or more lamps and optional flashers of the illuminated stop sign. Use of the same primary wire routing hole 96 for both the vehicle wiring connections and the illumination control wiring of the stop sign helps minimize the required penetrations through the sub-compartment perimeter walls in order to best retain the sealed, weatherproof state thereof. Like the primary wire routing hole, the second wire routing hole is preferably grommeted to prevent weather infiltration and wire damage.

Figure 11A:
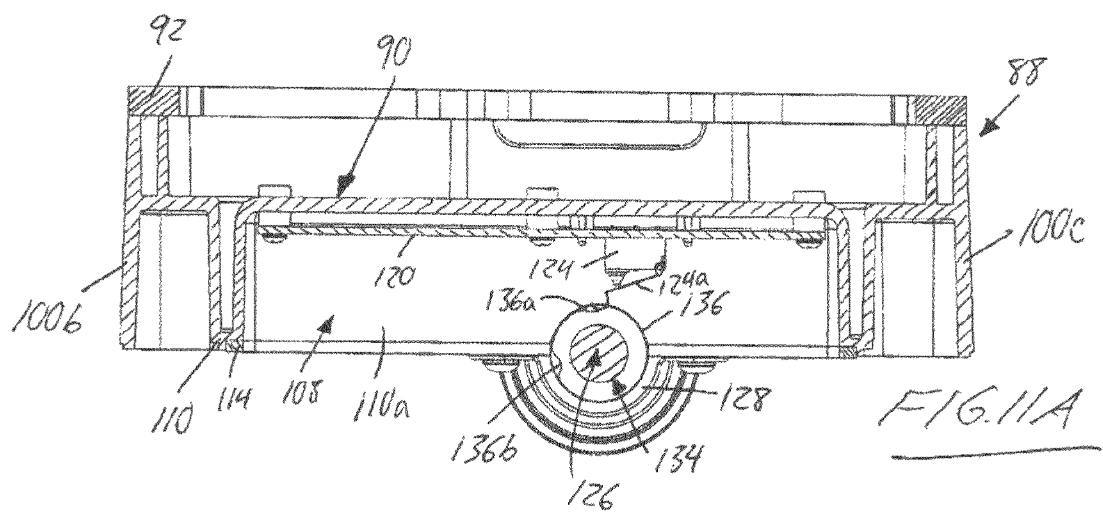
FIGS. 11A, 11B and 11C are cross-sectional views of the drive unit of FIG. 10 as viewed along line XI-XI thereof, with an output shaft of the motor assembly in different rotational positions respectively corresponding to retracted, deployed and intermediate positions of the stop sign.
Figure 11B:
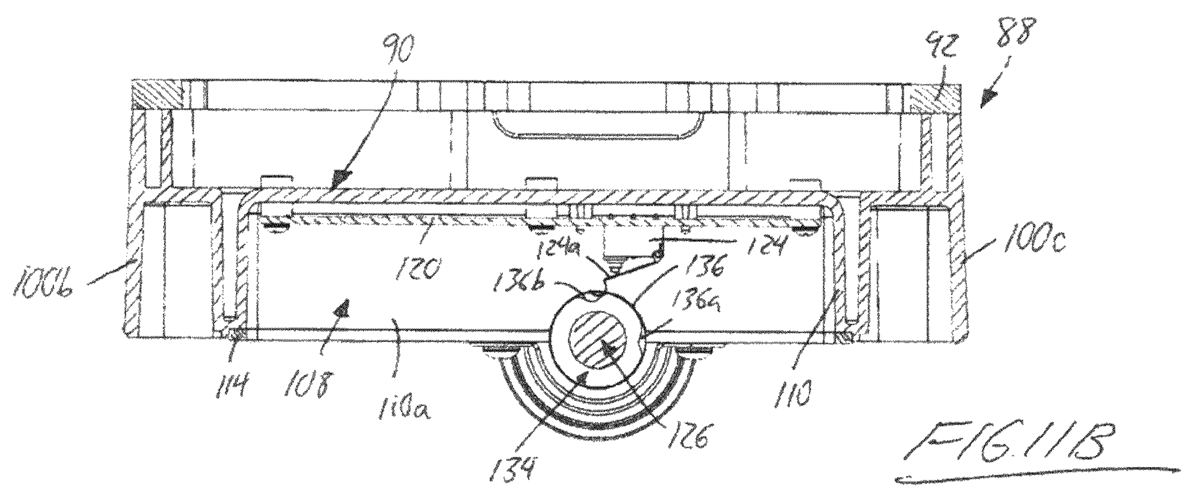
Figure 11C:
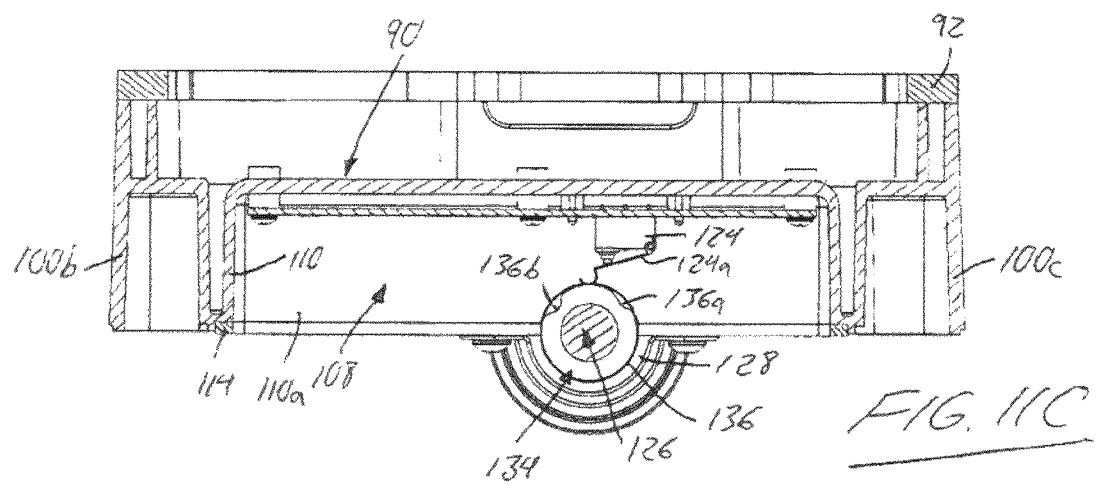

The lower stub shaft features a cam section 134 residing inside the sub-compartment 108 below the gearbox 160*b* and above the lower perimeter wall 110*a*. The position sensor 124 is mounted on the horizontal leg of the PCB at an elevation thereon matching the cam section 134 of the lower stub shaft. In the illustrated embodiment, the position sensor 124 is a limit switch having a contact arm 124*a* thereof in abutment with a profiled camming surface 136 of the lower stub shaft's cam section 134. With reference to FIG. 11, the profiled camming surface has a first recessed dip 136*a* at one angular position around the output shaft 126, and a second recessed dip 136*b* at another angular position spaced ninety degrees around the output shaft from the first recessed dip 136*a*. FIG. 11A shows the contact arm 124*a* of the position sensor 124 in contact with the camming surface 136 at the first recessed dip 136*a* thereof, which relative to the radially larger cylindrical remainder of the camming surface 136 between the two recessed dips allows the contact arm 124*a* to move outwardly from the plunger of the switch, thereby opening the switch. FIG. 11C shows the contact arm likewise occupying the second recessed dip 136*b*, thereby also corresponding to an open state of the switch. At all other areas of the camming surface, where the radius of the camming surface from the output shaft axis is greater than at the two recessed dips, the contact arm 124*a* is forced against the switch plunger; thereby closing the limit switch. The first recessed dip 136*a* on the profiled cam surface is positioned relative to the angular position at which the support arms 24*a*, 24*b* of the stop sign frame span radially outward from the output shaft axis of the motor assembly so that detection of the first recessed dip 136*a* by the sensor 124 indicates the retracted position of the stop sign, in which the stop sign resides generally parallel with the front and rear walls of the drive unit housing in close or coplanar relation with the rear wall thereof, whereby the stop sign lies parallel to the side wall of the bus in direct or indirect contact therewith. The position of the second recessed dip 136*b* in the camming surface, being at ninety degrees from the first, thus corresponds to the deployed position of the stop sign reaching laterally outward from the side of the bus in perpendicular relation thereto.

The sensor 124 is connected to an input of the controller so that switching of the sensor 124 between its on and off states serves as feedback to the controller on whether the stop sign is currently in one of its retracted or deployed states, as confirmed by an "off" or "open" state of the switch, or in some other intermediate position between its retracted or deployed states, as confirmed by an "on" or "closed" state of the switch. While the illustrated embodiment uses a physical limit switch as the position sensor to monitor the rotational position of the output shaft and corresponding position of the stop sign, and uses localized contours in a camming surface to form detectable position markers at fixed positions on the shaft denoting absolute rotational positions thereof, other embodiments may employ other sensor types. Examples include an ultrasonic or optical proximity sensor monitoring the distance therefrom to the camming surface to detect the recessed dips therein, or other sensors not necessary relying on a cam to determine the shaft position (e.g. hall effect sensor detecting magnetic components at the angularly spaced positions on the shaft, optical beam-interruption sensors relying on shaft-carried obstructions to selectively make and break the beam connection, etc.). In any instance, placement of the sensor inside the sub-compartment better protects the sensing arrangement against environmental hazards.

To prevent damage to the motor in the event that the stop sign hits an obstruction during movement between its retracted and deployed positions, the controller is wired to the motor in a condition monitoring circuit measuring an operational characteristic of the motor for conditions indicative of such an obstruction to sign movement. In one preferred embodiment, the controller monitors an operating current of the DC motor to detect current spikes indicative of such obstruction. This is also used in combination with the position sensor 124 to confirm when the stop sign has arrived at the retracted position during movement from the deployed position, as the motor current will spike as the stop sign comes into direct or indirect contact with the side of the bus. Examples of indirect contact would be embodiments in which a bumper, stop or wind guard may reside between the stop sign and side of the bus in the retracted position.

In some embodiments, in addition to or instead of monitoring the operating current of the motor, the controller monitors the counter-electromotive force generated by the motor.

In some embodiments, on start-up of the controller, i.e. when powered up by the vehicle's electrical system when the bus is started, the controller will automatically apply voltage to the DC motor in a manner driving rotation thereof in a retraction direction attempting to drive the stop sign into the retracted position, in case the stop sign was in a fully or partially deployed position. This might be, for example, if the bus was last shut off while the sign was fully or partially deployed, or if wind, another vehicle or a person had moved the sign out of the retracted position. During this operation of the motor in the retraction direction, the controller monitors both the shaft position (via the state of the position sensor 124) and the operating current of the motor. Detection of the both a current spike (and/or counter-electromotive force) and an "open" state of the position sensor confirms that the sign has been properly parked in its retracted position. Detection of a current spike (and/or counter-electromotive force) in combination with a "closed" state of the position sensor instead suggests that the sign has met with an unexpected obstruction, in response to which the controller may deactivate the motor, and then reactivate same in the retraction direction after a time delay so that the sign will automatically retract if the obstruction has since been removed. Additionally or alternatively, the controller may provide an alarm signal to the bus driver warning him/her of the potential obstruction (e.g. by way of an illuminated and/or audible alarm). Detection of a "closed" position sensor 124 absent a current spike (and/or counter-electromotive force) suggests a short circuit or other problem situation, in response to which the controller may again caution the bus driver through activation of a warning alarm.

When deployment of the stop sign is commanded by one or more incoming signals to the controller from the vehicle, the controller activates the motor in a deployment direction opposite the retraction direction, and monitors for change of the position sensor to its "open" state, thereby confirming arrival of the stop sign at the proper deployed position ninety degrees from the retracted position. Again, if a current spike (and/or counter-electromotive force) is detected during movement of the sign, suggestive of an obstruction, the motor is deactivated, as least temporarily, and a warning may be triggered. In some embodiments, a single sensor is used to detect both the deployed and retracted positions, in combination with current spike detection (and/or counter-electromotive force) to avoid motor damage in the case of sign obstruction. Using both the sensor and the current spike (and/or counter-electromotive force) to confirm parking of the sign in the retracted position prevents false interpretation of an unexpectedly obstructed position of the stop sign as a properly parked retraction of the sign. The controller may also be configured to short the motor leads together or connect the motor leads through a low impedance device, such as a resistor, when proper arrival in the retracted or deployed position is detected. Thus, dynamic braking of the DC motor may be used to prevent or limit overshoot of the targeted position. The controller may also be configured to maintain this shorted state or the low impedance motor power circuit in order to lock the stop sign in the current position until subsequent movement of the sign is commanded by appropriate signals from the vehicle.

Similarly, the controller may also be configured to limit the counter-electromotive force of the motor (i.e. back EMF) when proper arrival in the retracted or deployed position is detected. The controller may also be configured to maintain this limited back EMF of the motor state in order to lock the stop sign in the current position until subsequent movement of the sign is commanded by appropriate signals from the vehicle.

While the illustrated embodiment uses the "open" state of the sensor switch 124 to denote a positive "position confirmation" signal, and a "closed" state of the sensor switch 126 to denote the absence of a position confirmation signal, it will be appreciated that in other sensing circuits, this convention may be reversed. In other words, it is the switch of the sensor from one state to another that denotes an informative signal.

Figure 14:
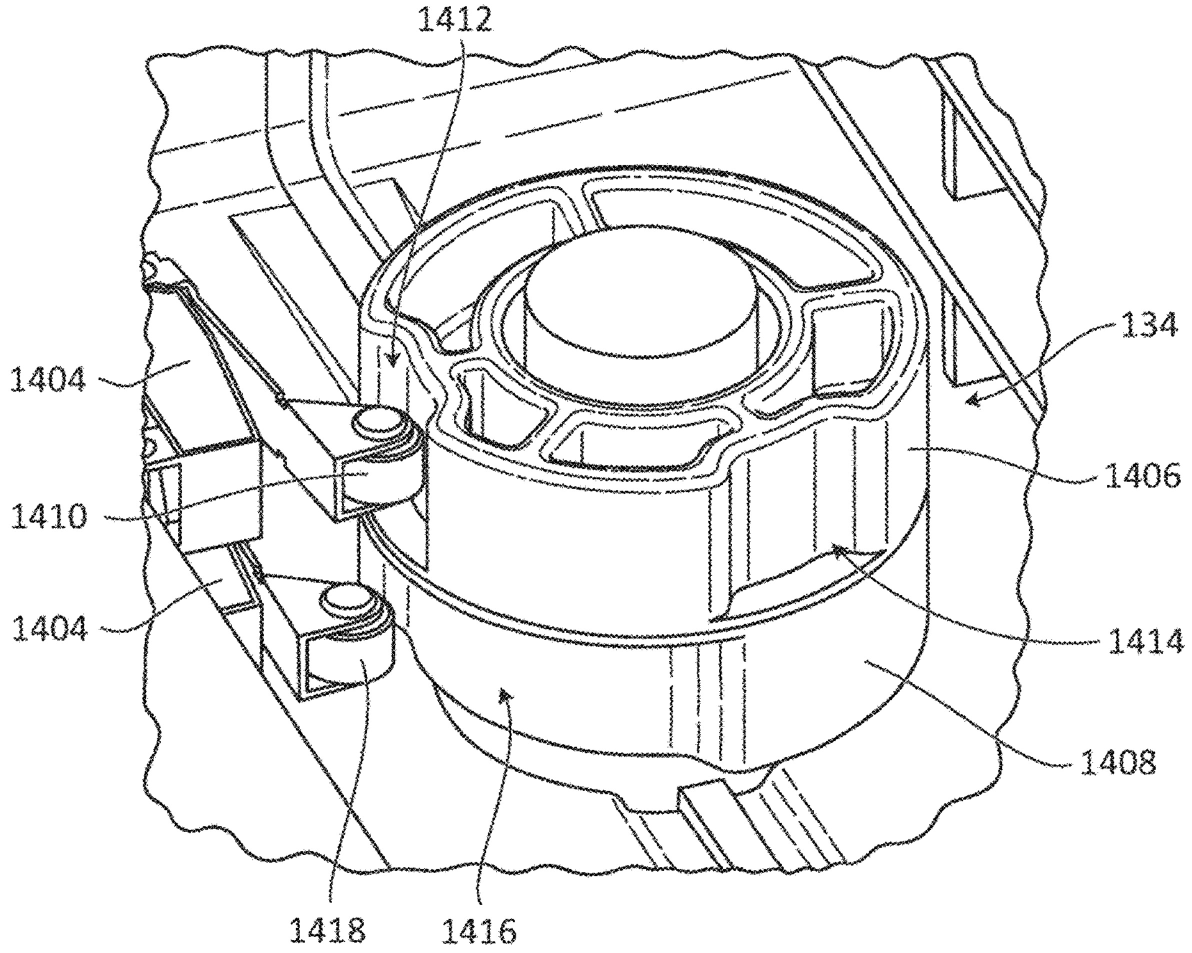
FIG. 14 is an enlarged view of a position sensor according to another embodiment of the present disclosure.

Referring to FIG. 14, other embodiments of the position sensor are also possible. In the illustrated embodiment of FIG. 14, the cam section 134 is provided as a separate bushing or shaft that extends around the motor's output shaft and is rotationally locked thereto, for example using a key or set screw. The position sensor 124 comprises two limit switches, 1402 and 1404, arranged vertically above one another, each cooperating with a different portion of the camming section 134. Namely, the first limit switch 1402 cooperates with a first camming surface portion 1406 and the second limit switch cooperates with a second camming surface portion 1408. The first limit switch 1402 is in a closed state during rotation and when the stop sign is in a deployed state. The first limit switch 1402 is in an open state when the first roller head 1410 occupies one of two dips 1412, 1414, which correspond with the retracted and over-traveled positions of the stop sign, respectively. In the illustrated embodiment, the over-traveled position is predefined at approximately 100 degrees from the retracted position and indicates that the stop sign as travelled too far. However, the over-traveled and deployed positions may be set as desired.

The second limit switch 1404 cooperates with the second camming surface portion 1408 differently. The second limit switch 1404 remains in an open state in the retracted position and during rotation of the camming section 134 towards the deployed position and is then forced into the closed state when the deployed position is reached. This is clear from the positioning of a central dip 1416 that overlaps with the dip 1412 but not dip 1414. In the deployed position, second roller head 1418 of the second limit switch 1408 contacts the outer surface of the second camming surface portion 1408 at its greatest diameter.

Thus, together, the two limit switches 1402, 1404 fully define four different states for the stop sign: Retracted, Transition, Deployed, and Overtravel. Thus, using two switches may aid in absolutely defining a state of the stop sign. In addition, according to the illustrated embodiment, during normal operation of the stop sign (i.e. no over-travel occurs) each limit switch activates only one time. Because limit switches have a limited rated number of activations, using two limit switches in the manner herein described may increase their lifetime in this application.

It will be understood that different positioning of the limit switches and configurations of the camming portions could be implemented to achieve the same determination of states of the stop, while still ensuring that during normal operation each limit switch only activates once. All such embodiments are within the present disclosure.

Moreover, the above description concerning the manner in which the controller may combine the conditions indicative of an obstruction and the confirmation signal from a single limit switch may be correspondingly adapted to the two-switch embodiment, as well. For example, an indication of an obstruction (e.g. current spike) together with a closed state of the first limit switch and an open state of the second limit switch may indicate an obstruction, while an indication of an obstruction with an open state of both the first and second limit switches may indicate a retracted position.

It may be desirable to prevent the stop sign from being too close to the school bus in the retracted position so that, for example, slight movements of the sign induced by wind or shaking/rattling during driving of the bus do not cause the stop sign to impinge the school bus side, thereby potentially causing damage to both the sign and the bus. This may be achieved by the presence of end travel bumpers integrated into the drive unit housing that also prevent overshoot of the stop sign in the retracted position.

In yet other embodiments, there may be more than two switches, each with its own open and closed state configurations, where combinations of the individual open and closed states would be combined to form universal open or closed states as determined by the controller.

Figure 12A:
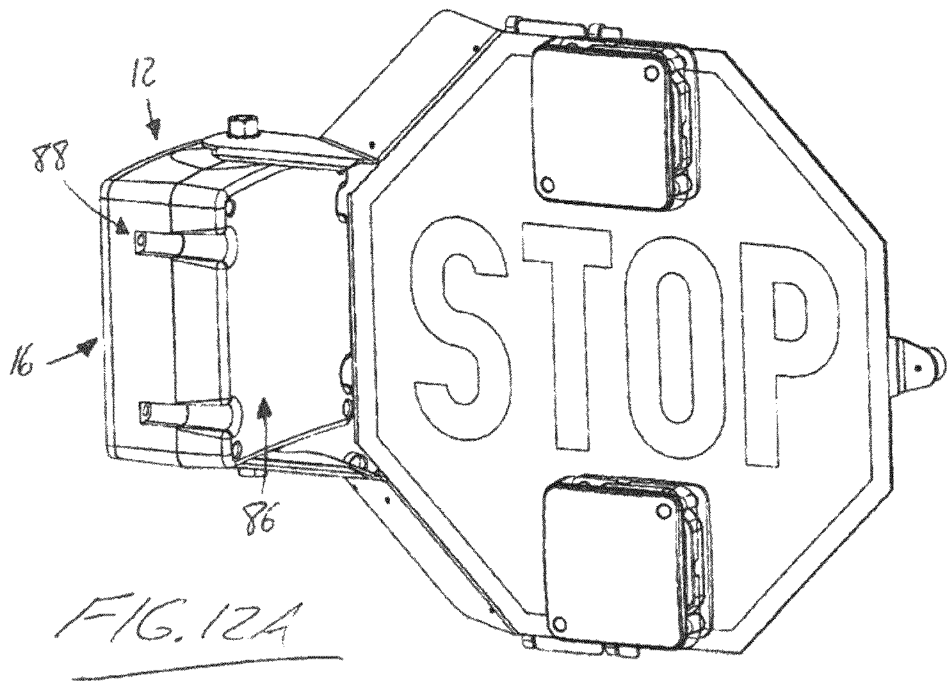
FIGS. 12A and 12B are top front and top rear perspective views, respectively, of the deployed position of a non-illuminated school bus stop arm according to a third embodiment, which features the same drive unit as the first and second embodiments.
Figure 12B:
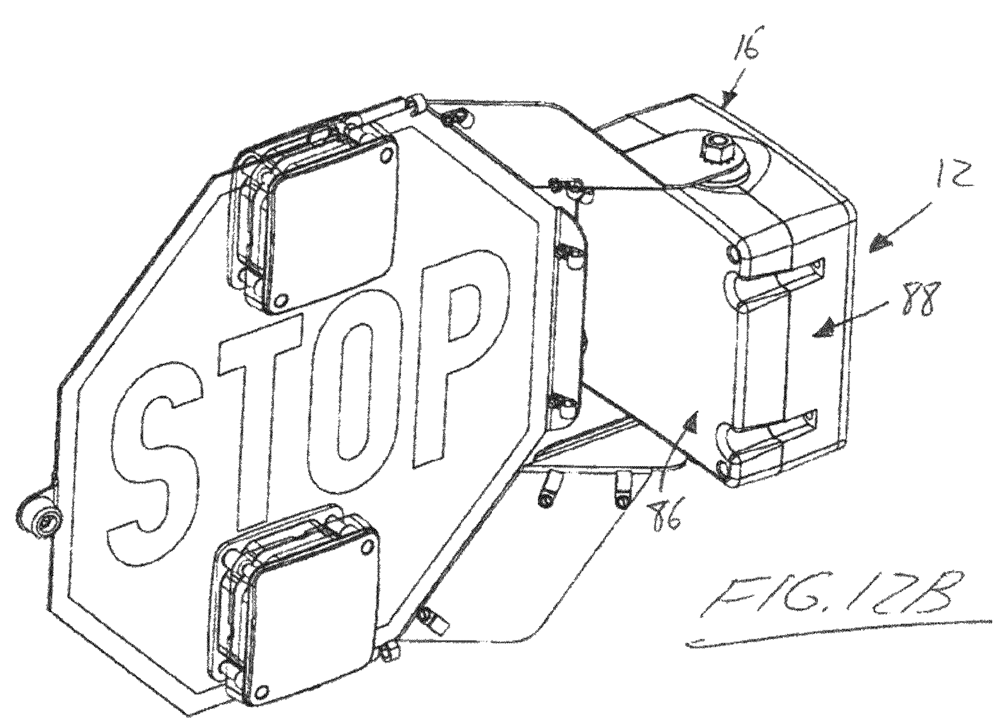
Figures 13A, 13B:
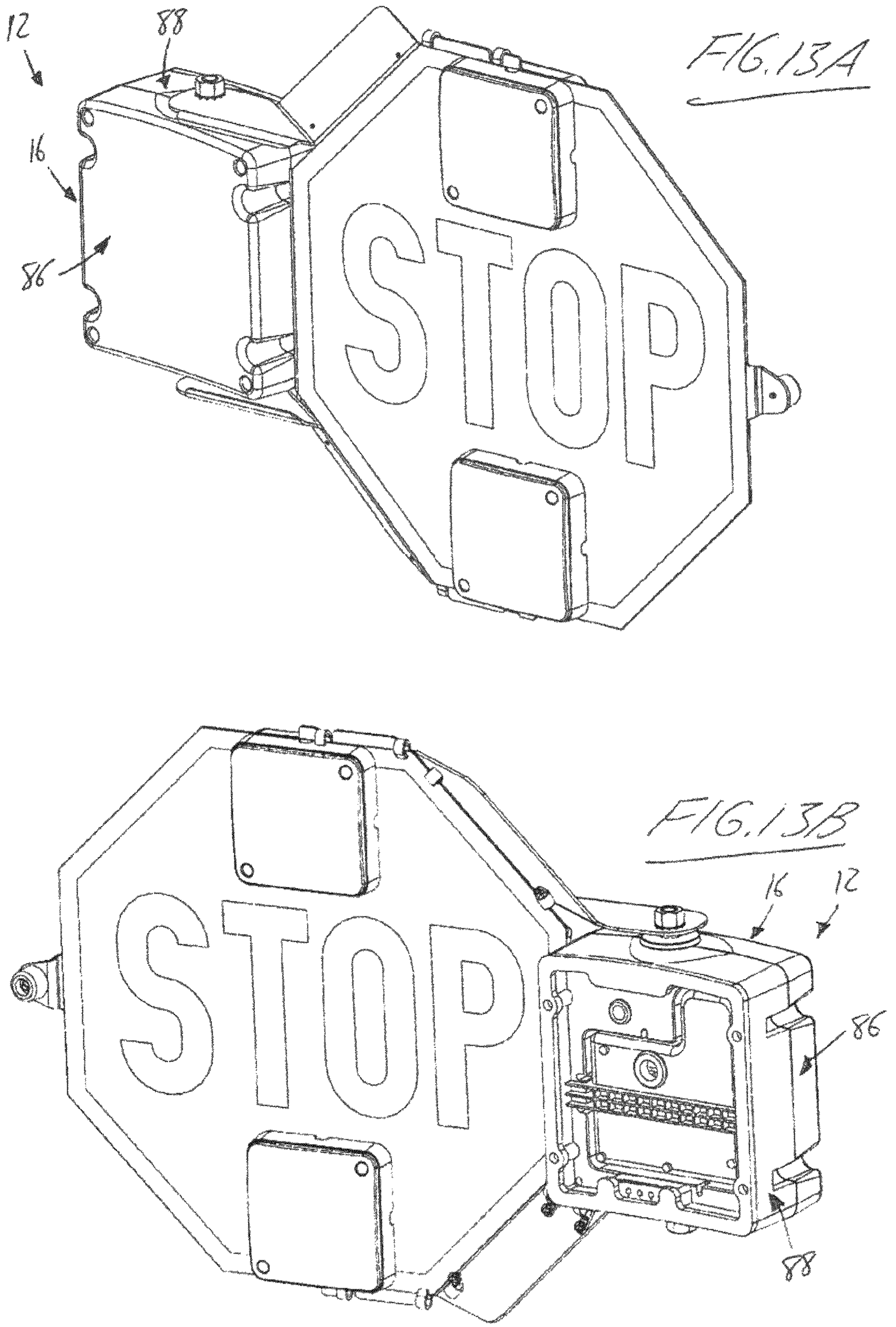
FIGS. 13A and 13B are top front and top rear perspective views, respectively, of the retracted position of the third embodiment school bus stop arm.

While the forgoing embodiments include illuminated stop signs, the same drive unit may be used with non-illuminated signs. This is illustrated in FIGS. 12 and 13, which show a stop arm employing an identical drive unit 12 to control movement of a double-sided, non-illuminated, flat-blade stop sign, which is shown with optional upper and lower flashers on both sides thereof, for example as may be required by regulation if the non-illuminated stop insignias on the two faces of the flat-blade stop sign are not retroreflective. FIGS. 12 and 13 also illustrate the above-discussed orientation of the stop sign relative to the drive unit in the deployed and retracted positions. FIGS. 12A and 12B show the front and rear of the stop sign, respectively, in the deployed position lying perpendicular to the front and rear walls of the drive unit's outer housing so as to reach laterally outward from the side of the school bus, while FIGS. 13A and 13B show the front and rear of the stop sign, respectively, in the retracted position lying parallel to the front and rear walls of the drive unit's outer housing so as to lie in folded parallel orientation along the side of the school bus.

In some embodiments, the controller is also operably connected to the elements 54*a* and 54*b* to selectively control their illumination. While described as "flashing" elements above, in some embodiments, elements 54*a* and 54*b* may be operated in either a flashing mode or a strobing mode. Depending on the desired implementation conditions of the user, the user may want to select either flashing or strobing mode. Thus, in some embodiments, selection of the flashing mode or strobing mode is made by closure of a circuit accessible from an exterior of the housing, such that the user may select either mode without the need to open the housing and, for example, close or short circuit two or more terminals on the PCB. Instead, the user may easily select either mode through a switch or other means of closing the selection circuit, which indicates to the controller that one of the two modes is selected. It will be understood that both embodiments where closure of the circuit results in flashing mode or strobing mode are within the present disclosure.

Figure 15:
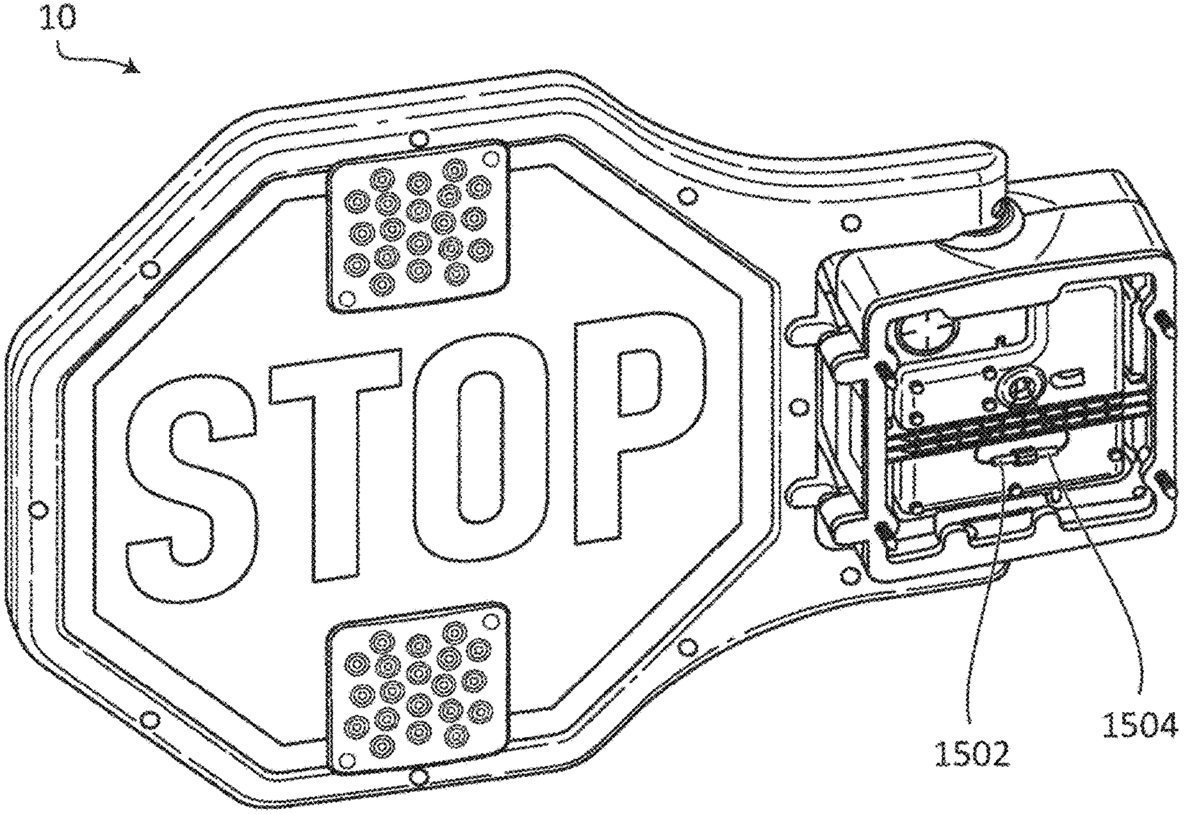
FIG. 15 is a perspective view of a rear of a stop arm drive unit according to one embodiment of the present disclosure.

Referring to FIG. 15, in one embodiment, the closure of the circuit is made by connecting two jumper wires 1502, 1504 that extend from the housing through wire routing hole 96 and are connected to the controller that is located inside of the drive unit. There are mating quick connect connectors on the end of each wire. In one example, the controller could be configured such that if the wires are connected the unit is in flashing mode and if the wires are disconnected the unit is in strobing mode.

In general, it may be desirable to position the means for closing the circuit, such as the jumper wires or a switch, in the cavity formed between the housing and the school bus, such that the closure of the circuit is protected from the elements during operation and less prone to accidental disconnection.

In some embodiments, such as embodiments where the stop sign is itself illuminated and includes flashing light, the controller may be configured to modulate the brightness of the sign together with the flashing or strobing of the lights to further attract attention to the sign, such as in the deployed position.

Other embodiments according to the present disclosure are also possible. In some embodiments, there may also be provided a handheld illuminated stop sign intended to improve the safety of road crossing by means of improving the visibility of the sign used by crossing guards. In some such embodiments, the sign is comprised of the sandwiched construction described above, with a front lens including insignia, a light diffusing panel, a reflective panel, bracket mounted LED strips, a perimeter seal, and a back panel. The sign is combined with a surrounding frame, handle with internal battery, LED driver, and momentary push button. The illumination of the sign is controlled via the push button. Brightness levels and strobe functions can be set by each sequential activation of the button. Moreover, in some embodiments, there may be two opposite facing signs. In some embodiments, the handheld sign also includes one or more RED flashing lights. In some embodiments, the handle is extended such that the base of the handle can be placed on the road surface to support the weight of the sign.

Moreover, while embodiments of the drive unit are described herein with reference to a motor (e.g. a DC motor) for performing the selective movement of the stop sign, other embodiments of the drive system for moving the stop sign are also within the scope of the present disclosure. In some embodiments, the drive unit includes a pneumatic drive for performing movement of the stop sign. Such a pneumatic drive would include pneumatic components such as pistons, valves, etc. Embodiments incorporating a pneumatic drive may be combined with other embodiments described herein. For example, in some embodiments a full illuminated sign, as described above, could be operated with a pneumatic drive. In such embodiments, the controller might determine when to activate illumination of the sign, and control brightness.

In some embodiments, it may be desirable to physically load the motor in order to increase the force (e.g. due to static friction, magnetism, etc.) that needs to be overcome in order to begin movement of the motor when the drive unit is in an unpowered state. For example, when the drive unit is powered off, the wind or air movement caused by driving of the school bus, might exert a force on the stop sign to move it out of the retracted position when not desired. A physical load might reduce the likelihood of this event by increasing the force required to move the sign. However, the load would be removed when the movement of the sign is intended. A loading device to physically load the motor could be arranged at the motor, e.g. on an output shaft, in the gear box or after the gear box or gear train.

Figure 16:
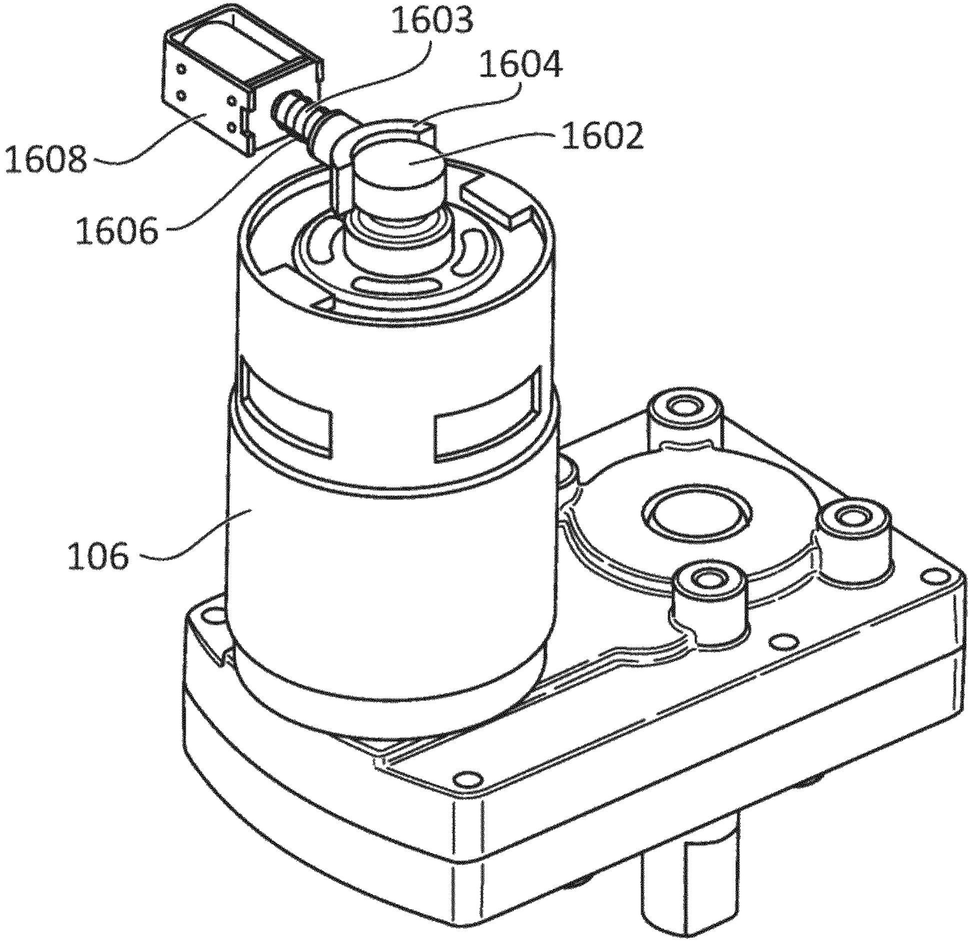
FIG. 16 is a perspective view of a motor assembly and loading device according to one embodiment of the present disclosure.

Referring to FIG. 16, in some embodiments the loading device may include a brake disc 1602 arranged on an output shaft of the motor assembly 106. A movable friction pad 1604 is arranged to engage the brake disc 1602 when the drive unit is in an unpowered state. In the illustrated embodiment, the friction pad 1604 is arranged on the end of arm 1603 and is biased to be in contact with the brake disc 1602 by spring 1606, when the drive unit is an unpowered state. This state is shown in FIG. 16. If excessive external force (e.g. due to wind) is applied to the stop arm, the friction pad 1604 will slip on and resist movement of the breaking disk and motor shaft to reduce or prevent mechanical damage of the components.

Arm 1603 is operably connected to solenoid 1608, which, when powered, retracts the arm 1608 with friction pad 1604 and compresses the spring 1606. Thus, in a powered state, the loading device disengages the motor.

Other embodiments of the loading device are possible. For example, other biasing means may be used to bias the friction pad. Engagement between the loading device and motor may also be arranged differently, for example using an arm shaft. The loading device may also include magnetic brakes instead of a solenoid activated friction pad.

In some embodiments, the drive unit of the stop arm might contain an energy storage device, such as a super capacitor or battery, which is operably coupled to and controlled by the controller. An energy storage device would allow the stop arm to store energy while in the retracted position that can be used during sign deploy and illumination. By storing energy while the sign is not in use, peak load currents on the vehicle power system could be reduced.

Figure 17:
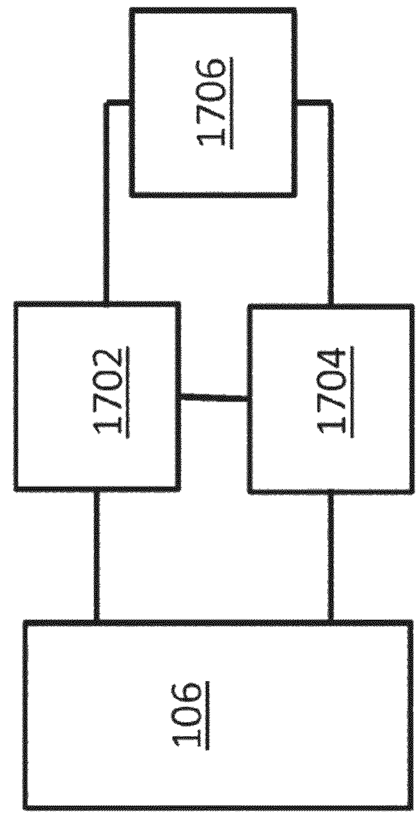
FIG. 17 is a schematic view of a control system including an energy storage device according to one embodiment of the present disclosure.

Referring to the schematic of FIG. 17, the controller 1702 would be operably coupled to both the motor assembly 106 and the energy storage device 1704, allowing the controller 1702 to direct energy from the energy storage device to the motor assembly 106 for use in operating the motor. In some embodiments, such as embodiments where the stop sign 1704 is illuminated or includes flashing elements, the controller 1702 may also configured to direct energy from the energy storage device 1706 for use in illuminating the stop sign and/or flashing elements.

Moreover, in embodiments where the stop arm may include other electronic components, the controller may be configured to direct energy from the energy storage for use in operation of the components. Such components could include one or more additional illumination elements, a camera, one or more processors and others.

In embodiments where the drive unit includes a pneumatic drive, the energy storage device may be used to supply power to illumination element of the stop sign, for example elements to illuminate the sign and/or the flashing elements. Accordingly, the controller would be configured to direct power from the energy storage to those illumination elements.

Embodiments of the present disclosure may include additional features to reduce peak power usage of the stop arm. In some embodiments, such as embodiments where the stop sign incorporates illumination elements to illuminate the sign and/or provide flashing lights, the controller may be configured to reduce the brightness of the illumination elements during deployment of the sign when the higher current is required to drive the motor. The controller would monitor the current being drawn from the power supplied by the vehicle and reduce the brightness of the illuminated sign and/or flashing lights while the sign is being deployed to reduce peak power requirements. The controller would be further configured to increase the brightness of the illumination elements to a desired brightness once the sign has been fully deployed and the motor is no longer being driven.

In some embodiments, peak power may be reduced by monitoring the signal from the school bus and only loading the signal when necessary. Namely, often, the signal from the vehicle to the drive unit of the stop arm is known to float in voltage if not loaded sufficiently. In some embodiments, to minimize the power draw on this signal, the controller controls the load on this signal to check if it is actively being driven and is an intended control signal or is just floating high. This load could be modulated based on the current voltage measurement of the signal and how frequently the sign checks the state of the signal. Thus, the controller could be configured to monitor the voltage of the signal from the school bus and periodically load the signal if the voltage is within a predetermined range in order to determine if the signal is the intended control signal to activate aspects of the sign, such as deployment and/or illumination of the sign and flashing elements.

If the voltage is below the predetermined range, the controller would determine that the signal is not the intended control signal without loading. If it is above the range, the controller would determine the signal is not floating and is indeed the intended control signal, without a need to load it.

For instance, for a control signal voltage from 0-5 V the controller decides that the signal is low and the stop arm is then commanded off; because the voltage is below the threshold the extra load is not turned on. For a control signal voltage from 5-8 V the controller decided to periodically load the signal, by adding the additional load for 1 ms every 10 ms and check to see whether the voltage remains constant with the additional load. If so it would determine that the stop arm is indeed commanded on. If the voltage of the control signal drops to below the predetermined range with the additional load the stop arm would then be commanded off. Finally, for voltages of the control signal from 8-12 V the controller decides that the signal is indeed high, not merely floating high, and does not require additional load. The stop arm would then be commanded on.

In some embodiments, the stop arm may be configured to operate with school buses of different nominal voltage. For example, the stop arm drive unit could be installed on vehicles with either 12 Vdc or 24 Vdc nominal voltages. To allow for a signal stop arm drive unit to work on either vehicle type the stop arm controller is configured to detect and measure the incoming voltage and determine whether the vehicle is a 12 Vdc or 24 Vdc system. The controller is configured to adjust the control signal thresholds accordingly to initiate deployment of the stop sign. For instance, on a 12 Vdc system the controller may need to measure 8 Vdc to deploy the stop arm, but on a 24 Vdc vehicle the controller may need to measure 16 Vdc to deploy the stop arm.

It will be understood that the specific voltages may vary and different voltage ranges are within the scope of the present disclosure. Similarly, it will be understood that the specific voltages and timing of the loading signal may vary and different voltages and timing are within the scope of the present disclosure.

In some embodiments, the controller may be configured to monitor for and compensate for various factors affecting the time needed to deploy or retract the stop sign, to ensure consistency or at least to ensure that the time needed falls within a predetermined range. In such embodiments, the controller monitors one or more parameters influencing the time needed to move the stop sign between the deployed and retracted positions and adjusts control of the motor based on the one or more parameters.

In some embodiments, the controller measures the incoming voltage being supplied by the school bus. The controller inversely control the duty cycle of the pulse-width modulation (PWM) signal to the motor controller to compensate for any change in any voltage being supplied to the motor. For example, at twice the voltage, the motor would be driven with half the duty cycle to compensate.

In some embodiments, the controller measures the ambient temperature of the environment surrounding the stop arm. The controller inversely controls the duty cycle of the PWM signal to the motor to compensate for any changes in friction due to temperature. For example, at colder temperatures, when the gear train is stiffer, a higher duty cycle would be needed to compensate.

In some embodiments, the controller measures the current drawn by the motor and uses this to estimate the speed in which the motor is turning. The controller controls the duty cycle of the PWM signal to the motor to speed up or slow down the motor as required.

In some embodiments, the controller measures the counter-electromotive force (back EMF) from the motor and uses this to estimate the speed with which the motor is turning. The controller controls the duty cycle of the PWM signal to the motor to speed up or slow down the motor as required.

Moreover, all methods arising from the operation of the stop arm, motor, controller and other elements described above are considered to be within the scope of the present disclosure.

For example, in some embodiments, there is provided a method of operating a stop arm mounted on a school bus, the stop arm having a stop sign, the method comprising: operating a motor to move the stop sign between a retracted position and a deployed position; monitoring one or more operating characteristics of the motor for conditions indicative of an obstruction to movement of the stop sign; monitoring a confirmation signal indicative of the presence of the stop sign in the deployed or retracted position; and determining if the stop sign has reached one of the deployed and retracted positions or is being obstructed.

In some embodiments, there is provided a method of operating a stop arm mounted on a school bus, the stop arm having a stop sign with one or more illumination elements, the method comprising: operating a motor to move the stop sign between a retracted position and a deployed position; monitoring a position of the stop sign; and reducing a brightness of the one or more illumination elements during movement of the stop between the retracted and deployed positions.

In some embodiments, there is provided a method of operating a stop arm mounted on a school bus, the stop arm having a stop sign, the method comprising: monitoring a voltage of a signal from the school bus; periodically loading the signal if the voltage is within a predetermined range; and determining if the signal is an intended control signal.

In some embodiments, there is provided a method of operating a stop arm mounted on a school bus, the stop arm having a stop sign, the method comprising: detecting a nominal voltage of an electrical system of the school bus; and adjusting a threshold voltage of a control signal required to initiate deployment of the stop.

In some embodiments, there is provided a method of operating a stop arm mounted on a school bus, the stop arm having a stop sign, the method comprising: operating a motor to move the stop sign between a retracted position and a deployed position; monitoring one or more parameters influencing a time required to move the stop sign between the deployed and retracted positions; and adjusting control of the motor so that the time required to move the stop sign between the deployed and retracted positions is within a predetermined range.

What has been described is merely illustrative of the application of principles of embodiments of the present disclosure. Other arrangements and methods that could be implemented by those skilled in the art based on the present disclosure are within the scope of the present disclosure.

What is claimed is:

1. A stop arm for a school bus comprising:

a stop sign including:

a frame defining an area to be illuminated having a written stop message surrounded by a backdrop, the area to be illuminated having the shape of an octagon or an octagon with one or more cutouts, and an internal illumination device comprising a plurality of LEDs that, upon activation, illuminate the area to be illuminated; and a drive unit mountable to a side of the school bus for selectively moving the stop sign between a deployed position and a retracted position.

2. The stop arm of claim 1, wherein the internal illumination device comprises a panel that diffuses light emitted by the LEDs.

3. The stop arm of claim 2, wherein the written stop message and backdrop are applied to the panel.

4. The stop arm of claim 2, wherein the panel has the shape of an octagon or an octagon with one or more cutouts.

5. The stop arm of claim 1, wherein the LEDs are mounted on one or more back plates positioned within the stop sign.

6. The stop arm of claim 1, the stop sign further comprising a lens, at least a portion of the lens having the shape of an octagon or an octagon with one or more cutouts.

7. The stop arm of claim 6, wherein the written stop message and backdrop are applied to the lens.

8. The stop arm of claim 1, wherein the frame encloses an outer perimeter of a lens, at least a portion of the lens having the shape of an octagon or an octagon with one or more cutouts, wherein the written stop message and backdrop are applied to the lens.

9. The stop arm of claim 1, wherein the stop sign comprises two areas to be illuminated at opposite sides of the stop sign, each of the two areas to be illuminated comprising a respective written stop message surrounded by a respective backdrop and having the shape of an octagon or an octagon with one or more cutouts, and wherein the internal illumination device, upon activation, illuminates both areas to be illuminated.

10. The stop arm of claim 9, wherein each written stop message and backdrop is applied to a respective lens mounted in the frame.

11. The stop arm of claim 1, wherein the area to be illuminated has a retro-reflective surface.

12. The stop arm of claim 1, wherein the stop sign includes a pair of cutouts and a flasher occupying each of the pair of cutouts.

13. The stop arm of claim 12, wherein the area to be illuminated Surrounds the cutouts.

14. The stop arm of claim 1, wherein the stop sign includes two flashers, and wherein the area to be illuminated surrounds the flashers.

15. The stop arm of claim 1, wherein the frame includes an octagonal sign section defining the area to be illuminated.

16. The stop arm of claim 1, wherein the frame is comprised of two or more frame components that mate together.

17. A stop arm for a school bus comprising:

a stop sign including:

a frame having an octagonal sign section, the sign section defining a space, a stop lamp being installed within the space, the stop lamp having an internal illumination device comprising LEDs, that, when activated, illuminate an octagonal stop insignia comprising of a written stop message on a backdrop such that a complete octagon or an octagon with one or more cutouts is illuminated; and a drive unit mountable to a side of the school bus for selectively moving the stop sign between a deployed position and a retracted position.

18. The stop arm of claim 17, wherein the stop lamp includes two cutouts and wherein a flasher occupies each of the cutouts.

19. The stop arm of claim 17, wherein the stop lamp comprises lens, the stop insignia being applied to the lens.

20. The stop arm of claim 17, wherein the space extends through the frame from a front to a rear of the stop sign, the stop lamp being double-sided such that respective stop insignia on opposite sides of the stop sign are illuminated upon activations of the LEDs.

21. The stop arm of claim 17, wherein the stop insignia is retro-reflective.

22. The stop arm of claim 9, wherein the stop sign includes a pair of cutouts in each of the two areas to be illuminated and a flasher occupying each cutout.

23. The stop arm of claim 22, wherein the flasher occupying each cut out is part of a double-sided flasher such that a first side of the double-sided flasher is visible from a first side of the sign and a second side of the double-side flasher is visible from a second side.

24. The stop arm of claim 9, wherein a pair of flashers are disposed on each side of the opposite sides.

25. The stop arm of claim 1, wherein the stop sign defines a perimeter border that is different than the backdrop.

26. The stop arm of claim 25, wherein the perimeter border has a greater opacity than the backdrop.

27. The stop arm of claim 25, wherein the perimeter border has a greater opacity than the written stop message.

* * * * *